(12) United States Patent
Hoeks et al.

(10) Patent No.: US 8,064,140 B2
(45) Date of Patent: Nov. 22, 2011

(54) TRANSPARENT ARTICLES PREPARED FROM THERMOPLASTIC COMPOSITIONS HAVING LOW BIREFRINGENCE

(75) Inventors: Theodorus Lambertus Hoeks, Bergen op Zoom (NL); Jan Henk Kamps, VR Bergen op Zoom (NL); Dennis Karlik, Bergen op zoom (NL); Edward Kung, West Chester, PA (US); Michael Teruki Takemori, Rexford, NY (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/879,494

(22) Filed: Sep. 10, 2010

(65) Prior Publication Data

US 2011/0071261 A1   Mar. 24, 2011

Related U.S. Application Data

(63) Continuation-in-part of application No. 12/347,060, filed on Dec. 31, 2008, now Pat. No. 7,848,025.

(60) Provisional application No. 61/291,565, filed on Dec. 31, 2009.

(51) Int. Cl.
*G02B 3/00* (2006.01)
*G02B 7/00* (2006.01)

(52) U.S. Cl. ........ 359/642; 524/502; 524/599; 525/410; 525/418; 525/474; 528/196; 528/198; 528/271; 528/272

(58) Field of Classification Search .................. 359/642; 524/502, 599; 525/410, 418, 474; 528/196, 528/198, 271, 272
See application file for complete search history.

(56) References Cited

U.S. PATENT DOCUMENTS

| | | | |
|---|---|---|---|
| 5,321,114 A | 6/1994 | Fontana et al. | |
| 6,436,503 B1 | 8/2002 | Cradic et al. | |
| 6,537,636 B1 | 3/2003 | Wisnudel et al. | |
| 6,630,221 B1 | 10/2003 | Wong et al. | |
| 6,686,430 B1 | 2/2004 | Nagamune | |
| 2003/0120024 A1* | 6/2003 | Wehrmann et al. | 528/196 |

FOREIGN PATENT DOCUMENTS

| | | |
|---|---|---|
| DE | 2701173 A1 | 7/1978 |
| EP | 1302785 A1 | 4/2003 |
| EP | 1489123 A1 | 12/2004 |
| EP | 1251371 B1 | 2/2007 |
| EP | 1808461 A1 | 7/2007 |
| WO | 2009/045791 A1 | 4/2009 |

OTHER PUBLICATIONS

ASTM D 1003-00, Standard Test Method for Haze and Luminous Transmittance of Transparent Plastics, Jun. 10, 2000, 6 pages.
ASTM D 1238-04, Standard Test Method for Melt Flow Rates of Thermoplastics by Extrusion Plastometer, Dec. 1, 2004, 14 pages.
ASTM D 1925-70, Standard Test Method for Yellowness Index of Plastics, Jan. 22, 1970, 3 pages.
ISO 1133, Plastics-Determination of the melt mass-flow rate (MFR) and the melt-volume flow rate (MVR) of thermoplastics, Jun. 1, 2005, 20 pages.
International Search Report for International Application No. PCT/US2009/069801. mailed Dec. 4, 2010, 7 pages.
Written Opinion for International Application No. PCT/US2009/069801, mailed Dec. 4, 2010, 11 pages.
Written Opinion of the International Searching Authority dated Apr. 28, 2011 for International Application No. PCT/US2010/062009, International Filing Date Dec. 23, 2010.
International Search Report dated Apr. 28, 2011 for International Application No. PCT/US2010/062009, International Filing Date Dec. 23, 2010.

* cited by examiner

*Primary Examiner* — Terressa Boykin
(74) *Attorney, Agent, or Firm* — Cantor Colburn LLP

(57) ABSTRACT

An optical grade article comprises a thermoplastic composition comprising a poly(aliphatic ester)-polycarbonate copolymer comprising 10 to 25 wt % of a soft block ester unit derived from a $C_{20-44}$ aliphatic dicarboxylic acid or derivative thereof, 34 to 77 wt % of a carbonate unit derived from 2-hydrocarbyl-3,3-bis(4-hydroxyaryl)phthalimidine, 0 to 76 wt % of a carbonate unit derived from a dihydroxyaromatic compound not identical to the 2-hydrocarbyl-3,3-bis(4-hydroxyaryl)phthalimidine, wherein the weight percentages of soft block ester units, 2-hydrocarbyl-3,3-bis(4-hydroxyaryl) phthalimidine units, and dihydroxyaromatic compound units is 100 weight percent of the monomeric units of the poly (aliphatic ester)-polycarbonate, the refractive index of the thermoplastic composition is greater than 1.590, and the glass transition temperature of the poly(aliphatic ester)-polycarbonate is from 120 to 155° C. A camera lens also comprises the poly(aliphatic ester)-polycarbonate.

24 Claims, 10 Drawing Sheets

A. Example 25  B. Example 26  C. Comp. Example 1

TRANSPARENT ARTICLES PREPARED FROM THERMOPLASTIC COMPOSITIONS HAVING LOW BIREFRINGENCE

CROSS-REFERENCE TO RELATED APPLICATION

This application is a nonprovisional application claiming priority on U.S. Provisional Application No. 61/291,565, filed on Dec. 31, 2009, and is also a continuation-in-part of copending U.S. application Ser. No. 12/347,060, filed on Dec. 31, 2008, which applications are incorporated herein by reference.

BACKGROUND OF THE INVENTION

This invention is directed to transparent articles prepared from thermoplastic compositions having high flow and ductility, and in particular to optical lenses prepared from thermoplastic compositions comprising a poly(aliphatic ester)-polycarbonate copolymer.

Miniaturization, functionality integration and weight reduction are emerging trends in portable hand-held electronics. These devices must withstand everyday usage over their lifetime, which can be up to several years. These trends call for plastic materials having enhanced flow properties with the ability to fill thinner wall designs, and excellent impact performance over a variety of usage environments (for example, physical shock due to dropping the item, and extremes of temperature and humidity).

The ability to take high quality pictures with devices such as mobile phone cameras or other portable handheld devices thus necessitates the need for materials, and in particular lens materials, with better properties. A camera embedded into any of these portable devices typically includes a complex optical system of a matched series of lenses, each of which has distinct optical characteristics, so that the resulting lens system as a whole has a variety of capabilities to meet consumer needs.

Polycarbonates, relative to other thermoplastics, are noted for their exceptional optical properties, thermal resistance, and mechanical properties such as impact strength. Currently, exemplary commercially available materials for the fabrication of such lenses or lens systems includes materials such as, for example, bisphenoxyethanol polyesters including OKP4 and OKP4-HT, available from Osaka Gas Chemicals Co, but which are prepared from expensive specialty feedstocks. However, high flow, optical quality polycarbonates remain the incumbent material of choice for lens materials due to their high optical and mechanical performance properties and low-cost, readily available feedstocks. However, as the lenses become smaller and smaller, and the quality requirements (e.g. picture size, quality) become more stringent, the performance of commercial optical quality polycarbonate is no longer adequate.

Transparent polymer compositions with low haze are desirable for versatile, low cost, high volume manufacture of optical grade components such as lenses for goggles and face shields, light guides and panels, and for more rigorous applications such as digital photography. While glass and various highly transparent thermoplastics may be used, the currently available materials require either long processing time (such as for the grinding of glass lenses), or for plastics, have undesirable thermal properties (as with polymethyl methacrylate) or high birefringence (such as with many optical grade commercial polycarbonates).

BRIEF SUMMARY OF THE INVENTION

There exists a need for polycarbonate materials having improved melt flow properties while retaining the desirable optical and mechanical properties. The above-described and other drawbacks are alleviated by, in an embodiment, a camera lens comprising a thermoplastic composition comprising a poly(aliphatic ester)-polycarbonate copolymer comprising soft block ester units derived from an alpha, omega $C_{6-20}$ aliphatic dicarboxylic acid or derivative thereof, a dihydroxyaromatic compound, and a carbonate source, wherein the thermoplastic composition has a melt volume rate of 13 to 25 cc/10 min at 250° C. and under a load of 1.2 Kg and a dwell time of 6 minutes, according to ASTM D1238-04, and wherein the camera lens has an effective lens area of 0.5 to 100 mm².

In another embodiment, an optical lens having a shaped surface, comprises a thermoplastic composition comprising a poly(aliphatic ester)-polycarbonate copolymer comprising soft block ester units of the formula (8a)

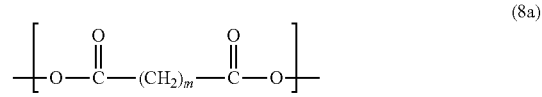

wherein m is 4 to 18; and optionally, a polycarbonate, wherein the thermoplastic composition has a melt volume rate of 13 cc/10 min to 25 cc/10 min at 250° C. and under a load of 1.2 Kg and a dwell time of 6 minutes, according to ASTM D1238-04, wherein an article molded from the thermoplastic composition and having a thickness of 3.2 mm has a haze of less than or equal to 1.0 percent, when measured according to ASTM D1003-00, and wherein the camera lens has an effective lens area of 0.5 to 100 mm².

In another embodiment, a method of making a camera lens, comprises molding a poly(aliphatic ester)-polycarbonate copolymer comprising soft block ester units derived from an alpha, omega $C_{6-20}$ aliphatic dicarboxylic acid or derivative thereof, a dihydroxyaromatic compound, and a carbonate source, wherein the thermoplastic composition has a melt volume rate of 13 to 25 cc/10 min at 250° C. and under a load of 1.2 Kg and a dwell time of 6 minutes, according to ASTM D1238-04, wherein the camera lens has an effective lens area of 0.5 to 100 mm², and wherein an optical lens prepared by the method has precision dimensions that deviate by less than 400 nm from a reference standard when measured by three dimensional contact profilometry.

In another embodiment, a camera lens comprises a thermoplastic composition, comprising a reaction product of a poly(aliphatic ester)-polycarbonate copolymer comprising 0.5 to 10 wt % soft block ester units derived from an alpha, omega $C_{6-20}$ aliphatic dicarboxylic acid or derivative thereof, a dihydroxyaromatic compound, and a carbonate source, with a redistribution catalyst, wherein the thermoplastic composition has a melt volume rate of 13 to 25 cc/10 min at 250° C. and under a load of 1.2 Kg and a dwell time of 4 minutes, according to ISO 1133, and wherein the camera lens has an effective lens area of 0.5 to 100 mm².

In another embodiment, an optical grade article comprises a thermoplastic composition comprising a poly(aliphatic ester)-polycarbonate copolymer comprising 10 to 25 wt % of a soft block ester unit derived from a $C_{20-44}$ aliphatic dicarboxylic acid or derivative thereof, 34 to 77 wt % of a carbonate unit derived from 2-hydrocarbyl-3,3-bis(4-hydroxyaryl)phthalimidine, 0 to 76 wt % of a carbonate unit derived from a dihydroxyaromatic compound not identical to the 2-hydrocarbyl-3,3-bis(4-hydroxyaryl)phthalimidine, wherein the sum of the weight percentages of soft block ester units, 2-hydrocarbyl-3,3-bis(4-hydroxyaryl)phthalimidine units, and dihydroxyaromatic compound units is 100 weight percent of the monomeric units of the poly(aliphatic ester)-polycarbonate, wherein the refractive index of the thermoplastic composition is greater than or equal to 1.590, and the glass transition temperature of the poly(aliphatic ester)-polycarbonate is from 120 to 155° C.

In another embodiment, an optical grade article comprises a thermoplastic composition comprising a poly(aliphatic ester)-polycarbonate copolymer comprising 10 to 21 wt % of a soft block ester unit derived from an alpha, omega $C_{20-44}$ aliphatic dicarboxylic acid or derivative thereof, 34 to 53 wt % of a carbonate unit derived from 2-hydrocarbyl-3,3-bis(4-hydroxyaryl)phthalimidine, 34 to 58 wt % of a carbonate unit derived from a dihydroxyaromatic compound not identical to the 2-hydrocarbyl-3,3-bis(4-hydroxyaryl)phthalimidine, wherein the sum of the weight percentages of soft block ester units, 2-hydrocarbyl-3,3-bis(4-hydroxyaryl)phthalimidine units, and dihydroxyaromatic compound units is 100 weight percent of the monomeric units of the poly(aliphatic ester)-polycarbonate, wherein the thermoplastic composition when molded into an article having a thickness of 3.2 mm, has a haze of less than or equal to 1.0 percent, when measured according to ASTM D1003-00, wherein the refractive index of the thermoplastic composition at a mold temperature of 100° C. is greater than or equal to 1.590, and the glass transition temperature of the poly(aliphatic ester)-polycarbonate is from 135 to 140° C.

In another embodiment, a camera lens comprises a thermoplastic composition comprising a) a poly(aliphatic ester)-polycarbonate copolymer comprising as monomeric units 10 to 25 wt % of soft block ester units of the formula (9e):

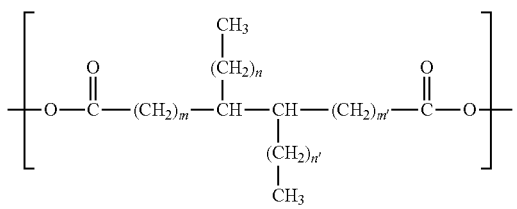

wherein m and m' are independently 0 to 38, n and n' are independently 0 to 38, and the sum m+m'+n+n' is an integer from 14 to 38; 34 to 77 wt % of a carbonate unit derived from 2-hydrocarbyl-3,3-bis(4-hydroxyaryl)phthalimidine, and 0 to 76 wt % of a carbonate unit derived from a dihydroxyaromatic compound not identical to the 2-hydrocarbyl-3,3-bis(4-hydroxyaryl)phthalimidine, wherein the sum of the weight percentages of soft block ester units, 2-hydrocarbyl-3,3-bis(4-hydroxyaryl)phthalimidine units, and dihydroxyaromatic compound ester units is 100 weight percent of the monomeric units of the poly(aliphatic ester)-polycarbonate, and b) optionally, a polycarbonate, wherein an article molded from the thermoplastic composition and having a thickness of 3.2 mm has a haze of less than or equal to 1.0 percent, when measured according to ASTM D1003-00, wherein the refractive index of the thermoplastic composition is greater than or equal to 1.59, and wherein the camera lens having an effective lens area of 0.5 mm² to 100 mm² and molded from the thermoplastic composition at a barrel temperature of 300° C., and measured for birefringence by the parallel Nicols method at a wavelength of 590 nm, has a birefringence of less than or equal to 90 nanometers.

In another embodiment, a camera lens comprises a thermoplastic composition comprising a) a poly(aliphatic ester)-polycarbonate copolymer comprising the following monomeric units:

10 to 25 wt % of soft block ester units of the formula (9e):

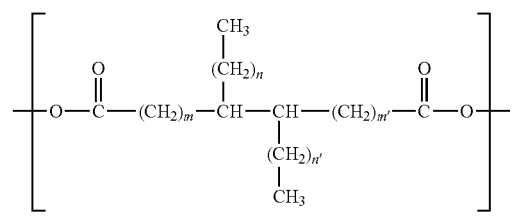

wherein m and m' are independently 0 to 38, n and n' are independently 0 to 38, and the sum m+m'+n+n' is an integer from 14 to 38;

34 to 77 wt % of a carbonate unit derived from 2-hydrocarbyl-3,3-bis(4-hydroxyaryl)phthalimidine, and 0 to 76 wt % of a carbonate unit derived from a dihydroxyaromatic compound not identical to the 2-hydrocarbyl-3,3-bis(4-hydroxyaryl)phthalimidine, wherein the sum of the weight percentages of soft block ester units, 2-hydrocarbyl-3,3-bis(4-hydroxyaryl)phthalimidine units, and dihydroxyaromatic compound units is 100 weight percent of the monomeric units of the poly(aliphatic ester)-polycarbonate, and b) a BPA polycarbonate wherein an article molded from the thermoplastic composition and having a thickness of 3.2 mm has a haze of less than or equal to 1.0 percent, when measured according to ASTM D1003-00, wherein the refractive index of the thermoplastic composition is greater than or equal to 1.590, and wherein the camera lens having an effective lens area of 0.5 mm² to 100 mm² and molded from the thermoplastic composition at a barrel temperature of 300° C., and measured for birefringence by the parallel Nicols method at a wavelength of 590 nm, has a birefringence of less than or equal to 90 nanometers.

A description of the figures, which are meant to be exemplary and not limiting, is provided below.

Figure 1:
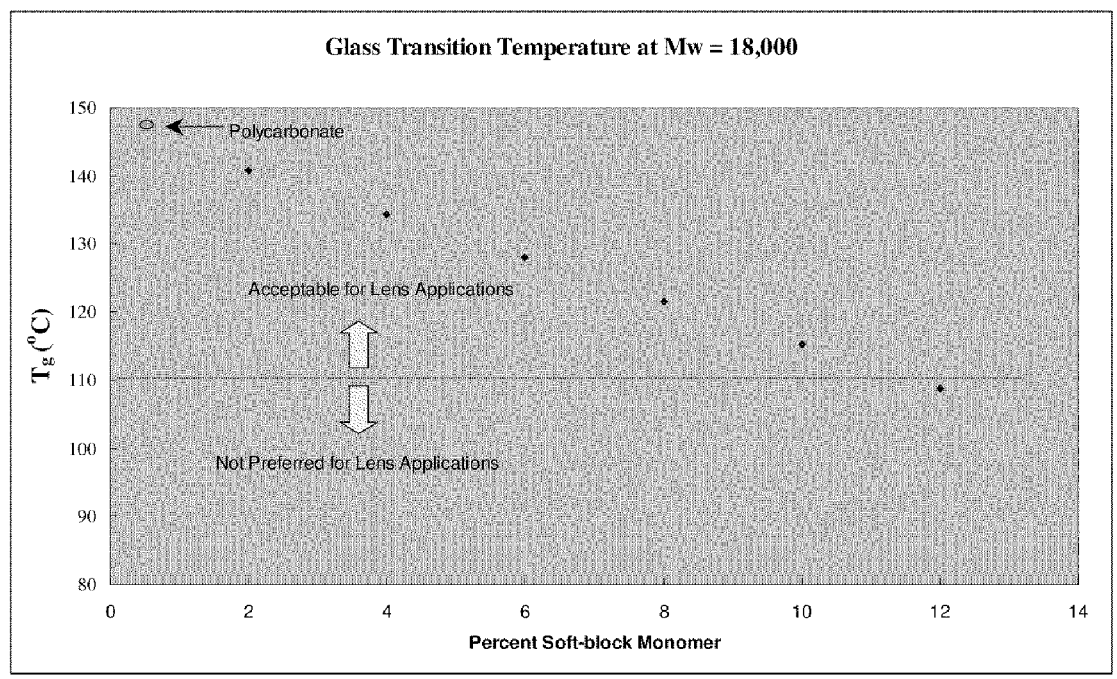
FIG. 1 is a plot of glass transition temperature versus percent soft block content for exemplary poly(aliphatic ester)-polycarbonates.

The above described and other features are exemplified by the following detailed description.

DETAILED DESCRIPTION OF THE INVENTION

Surprisingly, it has been found that a thermoplastic composition comprising a poly(aliphatic ester)-polycarbonate copolymer (also referred to herein as a polyester-polycarbonate having soft block units), provides excellent replication of curved surfaces when molded, which is necessary for optical lens applications. The thermoplastic composition exhibits a high degree of mold-filling suitable for preparing thin-wall articles, and desirably has excellent surface smoothness in the molded article with molding repeatability and excellent mold release characteristics. Also important for optical lens applications are the thermoplastic composition's excellent optical properties such as high transparency (i.e., high % transmission of 85% or more, and a low haze of less than 1%, measured on 3.2 mm plaques according to ASTM D1003-00), and low birefringence relative to standard optical-grade polycarbonates. The thermoplastic composition desirably has high melt flow (from 13 to 25 cubic centimeters per ten minutes (cc/10 min), measured under a load of 1.2 Kg and at a temperature of 250° C.), without sacrificing optical, mechanical, and surface finish properties.

Optical lenses prepared from the thermoplastic composition desirably have effective surface areas (defined as the usable surface area of the lens which permits the refracting of incident light) of 0.5 to 100 mm$^2$, and a lens thicknesses (measured through the center of the lens, parallel to the optical path of the least refracted incident light) of 0.25 mm to 2.5 mm. Optical lenses molded from the thermoplastic composition exhibit excellent mechanic properties, low birefringence, and excellent chemical and dimensional stability.

The thermoplastic composition from which the articles (e.g., optical lenses) herein are molded includes a poly(aliphatic ester)-polycarbonate. Generally, as used herein, the term or suffix "polycarbonate" means compositions having repeating structural carbonate units of the formula (1):

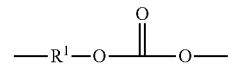

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

$$A^1\text{-}Y^1\text{-}A^2\text{-} \qquad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the reaction of dihydroxy compounds having the formula HO—$R^1$—OH, which includes dihydroxy compounds of formula (3):

$$\text{HO-}A^1\text{-}Y^1\text{-}A^2\text{-OH} \qquad (3)$$

wherein $Y^1$, $A^1$ and $A^2$ are as described above. Also included are bisphenol compounds of general formula (4):

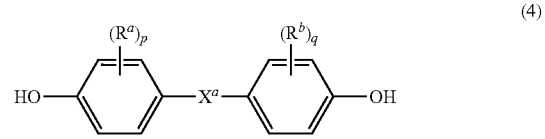

wherein $R^a$ and $R^b$ each represent a halogen atom or a monovalent hydrocarbon group and may be the same or different; p and q are each independently integers of 0 to 4; and $X^a$ represents one of the groups of formula (5):

wherein $R^c$ and $R^d$ each independently represent a hydrogen atom or a monovalent linear or cyclic hydrocarbon group and $R^e$ is a divalent hydrocarbon group.

In an embodiment, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (6):

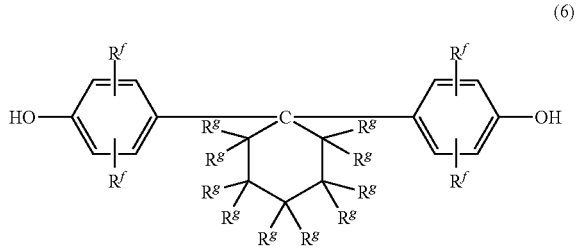

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (7):

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Exemplary dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that may be represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl) propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

In a specific embodiment, $X^a$ in formula (4) is a substituted, fused $C_{5-18}$ heterocycloalkylidene. In a specific embodiment, a dihydroxyaromatic monomer including the substituted, fused $C_{5-18}$ heterocycloalkylidene is a 2-hydrocarbyl-3,3-bis (4-hydroxyaryl)phthalimidine (also referred to as a 2-hydrocarbyl-3,3-bis(4-hydroxyaryl)-2,3-dihydroisoindol-1-one) of the formula (8):

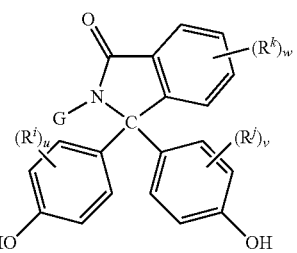

wherein $R^i$, $R^j$, and $R^k$ are independently $C_{1-12}$ hydrocarbyl, G is a $C_{1-12}$ alkyl or $C_{6-18}$ aromatic group, and u, v, and w are each independently an integer from 0 to 4. In an exemplary embodiment, the dihydroxyaromatic monomer is 2-phenyl-3,3-bis(4-hydroxyphenyl)phthalimidine (PPPBP), having the formula (8a):

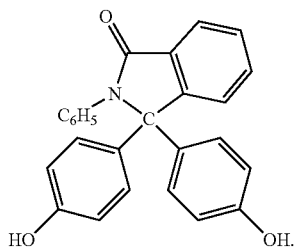

(8a)

In addition to the polycarbonates described above, combinations of the polycarbonate with other thermoplastic polymers, for example combinations of homopolycarbonates and/or polycarbonate copolymers, may be used.

In a specific embodiment, where a polycarbonate is included, the polycarbonate may be a linear homopolymer derived from bisphenol A, in which each of $A^1$ and $A^2$ is p-phenylene and $Y^1$ is isopropylidene. The polycarbonates generally may have an intrinsic viscosity, as determined in chloroform at 25° C., of 0.3 to 1.5 deciliters per gram (dl/g), specifically 0.45 to 1.0 dl/g. The polycarbonates may have a weight average molecular weight (Mw) of 10,000 to 100,000 g/mol, as measured by gel permeation chromatography (GPC) using a crosslinked styrene-divinyl benzene column, at a sample concentration of 1 milligram per milliliter, and as calibrated with polycarbonate standards.

In an embodiment, a polycarbonate may have a melt volume flow rate (often abbreviated MVR) measures the rate of extrusion of a thermoplastics through an orifice at a prescribed temperature and load. Polycarbonates useful for the formation of articles may have an MVR, measured at 300° C. under a load of 1.2 kg according to ASTM D1238-04 or ISO 1133, of 0.5 to 80 cubic centimeters per 10 minutes (cc/10 min). In a specific embodiment, where a polycarbonate is used in addition to the poly(aliphatic ester)-polycarbonate, the polycarbonate (or a combination of polycarbonates, i.e., a polycarbonate composition) has an MVR measured at 300° C. under a load of 1.2 kg according to ASTM D1238-04 or ISO 1133, of 45 to 75 cc/10 min, specifically 50 to 70 cc/10 min, and more specifically 55 to 65 cc/10 min.

"Polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), units of formula (9):

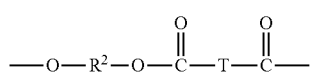

(9)

wherein $R^2$ is a divalent group derived from a dihydroxy compound, and may be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T is a divalent group derived from a dicarboxylic acid (aliphatic, aromatic, or alkyl aromatic), and may be, for example, a $C_{4-18}$ aliphatic group, a $C_{6-20}$ alkylene group, a $C_{6-20}$ alkylene group, a $C_{6-20}$ alicyclic group, a $C_{6-20}$ alkyl aromatic group, or a $C_{6-20}$ aromatic group. A copolymer is defined as a polymer containing at least two different monomers. When a copolymer contains three different monomers it can be referred to as a terpolymer as well. The term poly(aliphatic ester)-polycarbonate in the term poly(aliphatic ester)-polycarbonate copolymer is a descriptor of constituents contained in the polymer, but the copolymer should not be interpreted as being necessarily limited to a polymer containing these constituents.

$R^2$ may be a $C_{2-30}$ alkylene group having a straight chain, branched chain, or cyclic (including polycyclic) structure. Alternatively, $R^2$ may be derived from an aromatic dihydroxy compound of formula (4) above, or from an aromatic dihydroxy compound of formula (7) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers may vary broadly, for example 1:99 to 99:1, specifically 10:90 to 90:10, more specifically 25:75 to 75:25, depending on the desired properties of the final composition.

In an embodiment, the thermoplastic composition comprises a polyester-polycarbonate copolymer, and specifically a polyester-polycarbonate copolymer in which the ester units of formula (9) comprise soft block ester units, also referred to herein as aliphatic dicarboxylic acid ester units. Such a polyester-polycarbonate copolymer comprising soft block ester units is also referred to herein as a poly(aliphatic ester)-polycarbonate.

In an embodiment, the soft block ester unit can be a $C_{6-20}$ aliphatic dicarboxylic acid ester unit (where $C_{6-20}$ includes the terminal carboxyl groups), and may be straight chain (i.e., unbranched) or branched chain dicarboxylic acids, cycloalkyl or cycloalkylidene-containing dicarboxylic acids units, or combinations of these structural units. In an embodiment, the $C_{6-20}$ aliphatic dicarboxylic acid ester unit includes a straight chain alkylene group comprising methylene ($-CH_2-$) repeating units.

In a specific embodiment, a useful soft block ester unit comprises units of formula (9a):

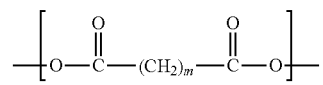

(9a)

where m is 4 to 18. In a specific embodiment of formula (9a), m is 8 to 10.

In an embodiment, the poly(aliphatic ester)-polycarbonate can include less than or equal to 25 wt % of the soft block unit. In an embodiment, a poly(aliphatic ester)-polycarbonate comprises units of formula (9a) in an amount of 0.5 to 10 wt %, specifically 1 to 9 wt %, and more specifically 3 to 8 wt %, based on the total weight of the poly(aliphatic ester)-polycarbonate.

The poly(aliphatic ester)-polycarbonate is a copolymer of soft block ester units and carbonate units. The poly(aliphatic ester)-polycarbonate is shown in formula (9b):

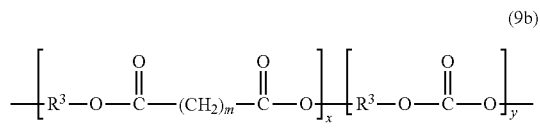

(9b)

where each $R^3$ is independently derived from a dihydroxyaromatic compound of formula (4) or (7), m is 4 to 18, and x and y each represent, in an embodiment, average weight percentages of the poly(aliphatic ester)-polycarbonate where the average weight percentage ratio x:y is 10:90 to 0.5:99.5, specifically 9:91 to 1:99, and more specifically 8:92 to 3:97, where x+y is 100. In another embodiment, each $R^3$ in formula (9b) is independently derived from a dihydroxyaromatic compound of formula (8), alone or in combination with another non-identical dihydroxyaromatic compound of formula (4) or (7). Also in another embodiment, x and y may each represent average weight percentages of the poly(aliphatic ester)-polycarbonate where the average weight percentage ratio x:y is 2:98 to 32:68, where x+y is 100. In another embodiment, x and y may each represent average mole percentages of the poly(aliphatic ester)-polycarbonate where the average mole percent ratio x:y is 7.5:92.5 to 30:70, where x+y is 100.

Soft block ester units, as defined herein, can be derived from an alpha, omega $C_{6-20}$ aliphatic dicarboxylic acid or a reactive derivative thereof. In a specific embodiment, the soft block ester units can be derived from an alpha, omega $C_{10-12}$ aliphatic dicarboxylic acid or a reactive derivative thereof. In another specific embodiment, the carboxylate portion of the aliphatic ester unit of formula (9a), in which the terminal carboxylate groups are connected by a chain of repeating methylene ($—CH_2—$) units (where m is as defined for formula (9a)), is derived from the corresponding dicarboxylic acid or reactive derivative thereof, such as the acid halide (specifically, the acid chloride), an ester, or the like. Thus in an embodiment, soft block units of Formula (9a) are derived from esterification of the corresponding unbranched alpha-omega aliphatic dicarboxylic acid of formula (9c):

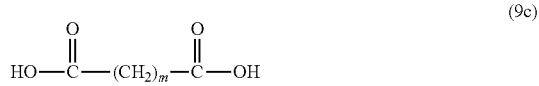

(9c)

where m is 4 to 18.

Exemplary alpha, omega dicarboxylic acids (from which the corresponding acid chlorides may be derived) include alpha, omega $C_6$ dicarboxylic acids such as hexanedioic acid (also referred to as adipic acid); alpha, omega $C_{10}$ dicarboxylic acids such as decanedioic acid (also referred to as sebacic acid); alpha, omega $C_{12}$ dicarboxylic acids such as dodecanedioic acid (sometimes abbreviated as DDDA), and alpha, omega $C_{16}$ dicarboxylic acids such as hexadecanedioic acid (sometimes abbreviated as HDDA). It will be appreciated that the aliphatic dicarboxylic acid is not limited to these exemplary carbon chain lengths, and that other chain lengths within the $C_{6-20}$ limitation may be used. A specific embodiment of the poly(aliphatic ester)-polycarbonate having soft block ester units comprising a straight chain methylene group and a bisphenol A polycarbonate group is shown in formula (9d):

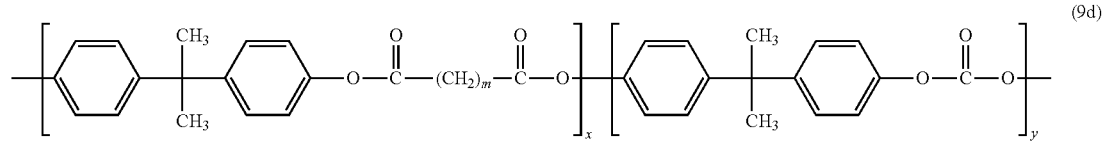

(9d)

where m is 4 to 18 and x and y are as defined for formula (9b). In a specific exemplary embodiment, a useful poly(aliphatic ester)-polycarbonate copolymer comprises sebacic acid ester units and bisphenol A carbonate units (formula (9d), where m is 8, and the average weight ratio of x:y is 6:94).

Desirably, the poly(aliphatic ester)-polycarbonate has a glass transition temperature (Tg) of 110 to 145° C., specifically 115 to 145° C., more specifically 120 to 145° C., more specifically 128 to 139° C., and still more specifically 130 to 139° C.

In another embodiment, the polyester-polycarbonate copolymer comprises an ester soft block of Formula (9) based on a $C_{6-44}$ aliphatic dicarboxylic acid. In an embodiment, the $C_{6-44}$ aliphatic dicarboxylic acid can be an ester unit of Formula (9a) based on a straight chain alpha, omega $C_{6-20}$ aliphatic dicarboxylic acid as described above. In another embodiment, the $C_{6-44}$ aliphatic dicarboxylic acid ester unit can be a branched chain $C_{14-44}$ aliphatic dicarboxylic acid ester unit of Formula (9e):

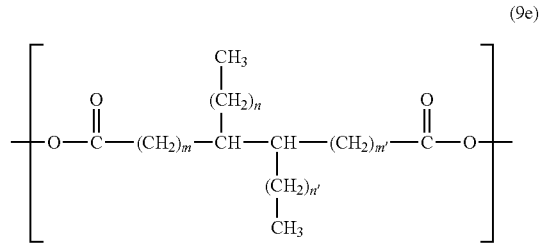

(9e)

where m and m' are independently 0 to 38, n and n' are independently 0 to 38, and the sum m+m'+n+n' is an integer from 8 to 38. In a specific embodiment, the aliphatic dicarboxylic acid is a $C_{20-44}$ aliphatic dicarboxylic acid where the sum m+m'+n+n' is an integer from 14 to 38. In a more specific embodiment, the aliphatic dicarboxylic acid is a $C_{21-44}$ aliphatic dicarboxylic acid where the sum m+m'+n+n' is an integer from 15 to 38. In a still more specific embodiment, the aliphatic dicarboxylic acid is a $C_{22-44}$ aliphatic dicarboxylic acid where the sum m+m'+n+n' is an integer from 16 to 38. In an embodiment, aliphatic dicarboxylic acids of formula (9e) are branched.

In another specific embodiment, a $C_{36}$ aliphatic dicarboxylic acid ester unit has the structure of formula (9e), where m and m' are independently 0 to 30, n and n' are independently 0 to 30, and the sum m+m'+n+n' is 30. In another specific embodiment, a $C_{36}$ aliphatic dicarboxylic acid ester unit has the structure of formula (9e), where each m and m' is independently 5 to 10, each n and n' is independently 5 to 10, and the sum m+m'+n+n' is 30. In an exemplary embodiment, in a $C_{36}$ aliphatic dicarboxylic acid ester unit, m and m' are independently 7 or 8, n and n' are independently 7 or 8, and the sum m+m'+n+n' is 30. In another specific embodiment, a $C_{44}$ aliphatic dicarboxylic acid ester unit has the structure of formula (9e), where m and m' are independently 0 to 30, n and n' are independently 0 to 30, and the sum m+m'+n+n' is 38. In an exemplary embodiment, in a $C_{44}$ aliphatic dicarboxylic acid ester unit, m and m' are independently 12 or 13, n and n' are independently 6 or 7, and the sum m+m'+n+n' is 38. Such diacids are also referred to generally as dimeric fatty acids, and may be derived from the condensation of readily available biologically-derived feedstocks.

In an embodiment, the poly(aliphatic ester)-polycarbonate having $C_{6-44}$ aliphatic dicarboxylic acid ester units is a copolymer of soft block ester units and carbonate units. The poly(aliphatic ester)-polycarbonate is shown in formula (9f):

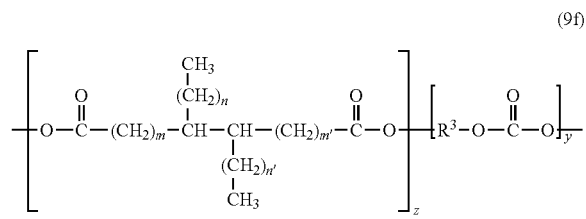

(9f)

where each $R^3$ is independently derived from a dihydroxyaromatic compound of formula (8), alone or in combination with another non-identical dihydroxyaromatic compound of formula (4) or (7), m, m', n, and n' are as defined for formula (9e). In one embodiment, z and y may each represent average weight percentages of the poly(aliphatic ester)-polycarbonate where the average weight percentage ratio z:y is 2:98 to 32:68, where z+y is 100. In another embodiment, z and y may each represent average mole percentages of the poly(aliphatic ester)-polycarbonate where the average mole percent ratio z:y is 7.5:92.5 to 30:70, where z+y is 100.

Soft block units of formula (9e) are derived from esterification of the corresponding carboxylic acid of formula (9g):

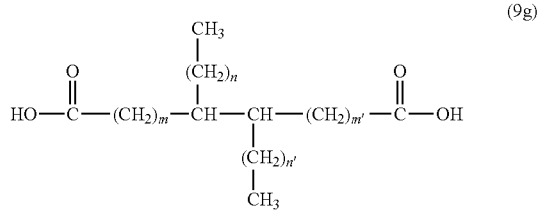

(9g)

wherein m, m', n, and n' are as defined for formula (9e).

In an embodiment, an aliphatic dicarboxylic acid of formula (9g) can be derived from the addition reaction of two unsaturated aliphatic acids. "Unsaturated", as used herein, can mean monounsaturated, diunsaturated, triunsaturated, polyunsaturated, or a combination of at least one of the foregoing. It will be understood that for unsaturated sites in the aliphatic dicarboxylic acid, the cis isomer, trans isomer, or a combination of cis and trans isomers can be present within reactant unsaturated aliphatic acid (such as where a single aliphatic dicarboxylic acid can have at least one each of a cis and trans isomerized double bond), or different isomers of unsaturated aliphatic acids may be combined (such as where a combination of a trans aliphatic acid and a cis aliphatic acid is used). Aliphatic acids that can be reacted to form the aliphatic dicarboxylic acid can include $C_{3-37}$ unsaturated acids, specifically $C_{4-30}$ unsaturated acids, more specifically $C_{6-22}$ unsaturated acids, and still more specifically $C_{12-22}$ unsaturated acids, provided the combined number of carbons in the reacted unsaturated acids is selected such that the resulting aliphatic dicarboxylic acid is a $C_{14-44}$ diacid.

In a specific embodiment, a useful aliphatic dicarboxylic acid is a $C_{36}$ aliphatic dicarboxylic acid that can be obtained from the reaction of two $C_{18}$ unsaturated acids, such as oleic acid, linoleic acid, or a combination of these. In another specific embodiment, a useful aliphatic dicarboxylic acid is a $C_{44}$ aliphatic dicarboxylic acid. In a further specific embodiment, a $C_{44}$ aliphatic dicarboxylic acid can be prepared by dimerization of erucic acid ($C_{22}$). Dimer fatty acids derived from natural sources are available commercially from chemical suppliers including Uniqema, Cognis, and Oleon.

Thus, in an embodiment, the poly(aliphatic ester)-polycarbonate comprises soft block ester units derived from a $C_{6-44}$ aliphatic dicarboxylic acid or derivative thereof, a carbonate unit derived from a 2-hydrocarbyl-3,3-bis(4-hydroxyaryl)phthalimidine, and a carbonate unit derived from a dihydroxyaromatic compound. As used in the poly(aliphatic ester)-polycarbonate herein, the dihydroxyaromatic compound and the 2-hydrocarbyl-3,3-bis(4-hydroxyaryl)phthalimidine are not identical. In another embodiment, the poly(aliphatic ester)-polycarbonate consists essentially of soft block ester units derived from a $C_{6-44}$ aliphatic dicarboxylic acid or derivative thereof, 2-hydrocarbyl-3,3-bis(4-hydroxyaryl)phthalimidine, and a dihydroxyaromatic compound. In still another embodiment, the poly(aliphatic ester)-polycarbonate consists of soft block ester units derived from a $C_{6-44}$ aliphatic dicarboxylic acid or derivative thereof, 2-hydrocarbyl-3,3-bis(4-hydroxyaryl)phthalimidine, and a dihydroxyaromatic compound. In an exemplary embodiment, the $C_{6-44}$ aliphatic dicarboxylic acid comprises sebacic acid, dodecanedioic acid, hexadecanedioic acid, a $C_{36}$ aliphatic dicarboxylic acid (sometimes referred to simply as $C_{36}$ diacid), or a combination comprising at least one of the foregoing.

In an embodiment, the poly(aliphatic ester)-polycarbonate includes as monomeric units 10 to 32 wt %, specifically 10 to 30 wt %, more specifically 10 to 25 wt %, more specifically 10 to 20 wt %, and still more specifically 12 to 20 wt % of the soft block ester units, based on 100 weight percent of the monomeric units of the poly(aliphatic ester)-polycarbonate.

Also in another embodiment, the poly(aliphatic ester)-polycarbonate includes as monomeric units 19 to 77 wt %, specifically 34 to 77 wt %, more specifically 34 to 75 wt %, more specifically 34 to 70 wt %, more specifically 34 to 60 wt %, and still more specifically 340 to 53 wt % of 2-hydrocarbyl-3,3-bis(4-hydroxyaryl)phthalimidine, based on 100 weight percent of the monomeric units of the poly(aliphatic ester)-polycarbonate.

Also in another embodiment, the poly(aliphatic ester)-polycarbonate includes 0 to 76 wt %, more specifically 0 to 65 wt %, and still more specifically 0 to 58 wt %, based on 100 weight percent of the monomeric units of the poly(aliphatic ester)-polycarbonate. In a specific embodiment, where the poly(aliphatic ester)-polycarbonate is a terpolymer, the poly(aliphatic ester)-polycarbonate includes 10 to 58 wt %, more specifically 20 to 58 wt %, still more specifically 33 to 58 wt %, and still more specifically 34 to 53 wt % of dihydroxyaromatic compound, based on 100 weight percent of the monomeric units of the poly(aliphatic ester)-polycarbonate.

It is desirable that a poly(aliphatic ester)-polycarbonate have, for the applications contemplated herein and particularly for lens applications, a refractive index (RI) of greater than or equal to 1.590 and a measured birefringence lower than of standard optical grade bisphenol A polycarbonate.

Birefringence (also referred to herein as "retardation"), which may be defined as the following product:

$$BR=(\text{refractive index of a part}) \times (\text{part thickness})$$

and expressed in units of thickness (herein, nanometers, abbreviated "nm"), is strongly dependent on molding conditions. The higher the level of isotropy (i.e., the higher the uniformity) of the molded article, the lower the birefringence. Changing the molding parameters by, for example, use of a higher molding temperature or by decreasing the holding time, can promote isotropy in the molded article. In particular, for the polymer compositions disclosed herein, articles prepared with increasing extruder barrel temperature and increasing mold temperature exhibit significant reduction in birefringence. Low birefringence in a molded plastic results in low light distortion and a better quality image. Moreover, since replication of parts such as lenses during molding is essential for consistent product properties, the processability (i.e., flowability) of the polymer is an important additional requirement. A glass transition temperature (Tg) of lower than 155° C. and a molecular weight low enough for sufficient flow properties (e.g., an Mw of less than or equal to 25,000 g/mol) is required. Birefringence may occur due to the anisotropic effect of polymer shape on its flow properties, where the polymer chains in an injection molded plastic (as in a molded lens, for example) orient along the direction of flow. Desirably, a high flow results in more randomization and a lower degree of orientation, and hence lower birefringence is associated with higher flow materials. Heat resistance is also required, where typical optical grade thermoplastics such as PMMA are typically not suited to such applications. A thermal stability based on a heat distortion temperature of at least 120° C. is therefore necessary in this application.

Surprisingly, it has been found that a poly(aliphatic ester)-polycarbonate comprising the soft block ester units derived from a $C_{14-44}$ aliphatic dicarboxylic acid or derivative thereof, a carbonate unit derived from 2-hydrocarbyl-3,3-bis(4-hydroxyaryl)phthalimidine, and a carbonate unit derived from a dihydroxyaromatic compound not identical to the 2-hydrocarbyl-3,3-bis(4-hydroxyaryl)phthalimidine, possesses desirable properties including a glass transition temperature and birefringence less than that of a comparable polycarbonate but without the soft block ester units, while maintaining a sufficiently high refractive index (e.g., greater than or equal to 1.590) to minimize the lens thickness as thin as possible. The combination of the aliphatic soft block which increases flow properties and reduces Tg, along with the desirable properties of the 2-hydrocarbyl-3,3-bis(4-hydroxyaryl)phthalimidine monomers (such as, for example, PPPBP) of low birefringence and high refractive index, when combined in a polymer in amounts of greater than 10 wt % of the soft block and greater than 34 wt % of the 2-hydrocarbyl-3,3-bis(4-hydroxyaryl)phthalimidine, provide a co- or terpolymer meeting the performance requirements for optical applications, and particularly for the camera lenses described herein. It has been observed that for increasing amounts of ester linkage, the decomposition of the polymer and yellowness of the molded article (e.g., lens) can increase. Desirably therefore, the ester functional group content should be maintained at as low a concentration as possible, to provide increased stability for the composition, where this is most readily accomplished by use of the higher carbon content (e.g., $C_{36}$) soft block units.

In an embodiment, the poly(aliphatic ester)-polycarbonate has a weight average molecular weight of 7,500 to 60,000 g/mol, specifically 10,000 to 50,000 g/mol, still more specifically 10,000 to 25,000 g/mol, and still more specifically 12,000 to 23,000 g/mol, when measured by gel permeation chromatography using a crosslinked styrene-divinylbenzene column calibrated to polycarbonate standards.

In an embodiment, the poly(aliphatic ester)-polycarbonate has a glass transition temperature of less than or equal to 155° C., specifically less than or equal to 150° C., and still more specifically less than or equal to 145° C. In another embodiment, the glass transition temperature is greater than or equal to 80° C., specifically greater than or equal to 90° C., more specifically greater than or equal to 100° C., and still more specifically greater than or equal to 110° C. In a specific embodiment, the poly(aliphatic ester)-polycarbonate has a glass transition temperature of greater than 120 to 155° C., more specifically 125 to 152° C., more specifically 130 to 150° C., more specifically 135 to 145C, and still more specifically 135 to 140° C.

In an embodiment, the poly(aliphatic ester)-polycarbonate has a refractive index measured by multi-angle ellipsometry of greater than or equal to 1.560, specifically greater than or equal to 1.570, more specifically greater than or equal to 1.580. In a specific embodiment, the poly(aliphatic ester)-polycarbonate has a refractive index of greater than or equal to 1.590, specifically greater than or equal to 1.595 and still more specifically greater than or equal to 1.600.

The intrinsic birefringence of a thin film of the poly(aliphatic ester)-polycarbonate can be measured from a cast thin film of the polymer having a thickness of 250 to 500 nm, which has been rubbed in one direction, by the difference in refractive index between the rubbed direction and perpendicular to the rubbed direction (i.e., orthogonal to, in the x-y plane of the thin film) measured by multi-angle ellipsometry using a beam of polarized light over the UV-VIS spectrum (about 200 nm to about 750 nm). In an embodiment, a thin film of the poly(aliphatic ester)-polycarbonate, having a thickness of 250 to 500 nm and rubbed to the point of saturation, has an intrinsic birefringence of less than or equal to 0.015, specifically less than or equal to 0.014, more specifically less than or equal to 0.013, and still more specifically less than or equal to 0.012.

In an embodiment, a plaque having a thickness of 1.2 mm and molded from the thermoplastic composition comprising the poly(aliphatic ester)-polycarbonate at a barrel temperature of 300° C. and a mold temperature of 100° C. has a comparative average birefringence measured by polarized light microscope using the Michel-Levy birefringence scale of less than or equal to 300 nm, specifically less than or equal to 250 nm, and more specifically less than or equal to 200 nm.

In another embodiment, a camera lens having an effective lens area of 0.5 mm² to 100 mm² and molded from a thermoplastic composition comprising the poly(aliphatic ester)-polycarbonate and at an extruder barrel temperature of 300° C., and measured for birefringence by the parallel Nicols method at a wavelength of 590 nm, has a birefringence of less than or equal to 90 nm, specifically less than or equal to 88 nm, and more specifically less than or equal to 85 nm.

Polycarbonates, including polyester-polycarbonates, can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents may be added at a level of about 0.05 to about 2.0 wt %. Mixtures comprising linear polycarbonates and branched polycarbonates may be used.

A chain stopper (also referred to as a capping agent) may be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides may also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes may be used to make the polycarbonates or polyester-polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a BANBURY® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl) carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing. In addition, transesterification catalysts for use may include phase transfer catalysts of formula $(R^3)_4Q^+X$ above, wherein each $R^3$, Q, and X are as defined above. Examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

Specifically, polyester-polycarbonates, including the poly (aliphatic ester)-polycarbonates, may be prepared by interfacial polymerization. Rather than utilizing the dicarboxylic acid (such as the alpha, omega $C_{6-20}$ aliphatic dicarboxylic acid) per se, it is possible, and sometimes even preferred, to employ the reactive derivatives of the dicarboxylic acid, such as the corresponding dicarboxylic acid halides, and in particular the acid dichlorides and the acid dibromides. Thus, for example instead of using isophthalic acid, terephthalic acid, or a combination comprising at least one of the foregoing (for poly(arylate ester)-polycarbonates), it is possible to employ isophthaloyl dichloride, terephthaloyl dichloride, and a combination comprising at least one of the foregoing. Similarly, for the poly(aliphatic ester)-polycarbonates, it is possible, and even desirable, to use for example acid chloride derivatives such as a $C_6$ dicarboxylic acid chloride (adipoyl chloride), a $C_{10}$ dicarboxylic acid chloride (sebacoyl chloride), or a $C_{12}$ dicarboxylic acid chloride (dodecanedioyl chloride). The dicarboxylic acid or reactive derivative may be condensed with the dihydroxyaromatic compound in a first condensation, followed by in situ phosgenation to generate the carbonate linkages with the dihydroxyaromatic compound. Alternatively, the dicarboxylic acid or derivative may be condensed with the dihydroxyaromatic compound simultaneously with phosgenation.

In an embodiment, where the melt volume rate of an otherwise compositionally suitable poly(aliphatic ester)-polycarbonate is not suitably high, i.e., where the MVR is less than 13 cc/10 min when measured at 250° C., under a load of 1.2 kg, the poly(aliphatic ester)-polycarbonate may be modified to provide a reaction product with a higher flow (i.e., greater than or equal to 13 cc/10 min when measured at 250° C., under a load of 1.2 kg), by treatment using a redistribution catalyst under conditions of reactive extrusion. During reactive extrusion, the redistribution catalyst is typically included in small amounts of less than or equal to 400 ppm by weight, by injecting a dilute aqueous solution of the redistribution catalyst into the extruder being fed with the poly(aliphatic ester)-polycarbonate.

In an embodiment, the redistribution catalyst is a tetraalkylphosphonium hydroxide, tetraalkylphosphonium alkoxide, tetraalkylphosphonium aryloxide, a tetraalkylphosphonium carbonate, a tetraalkylammonium hydroxide, a tetraalkylammonium carbonate, a tetraalkylammonium phosphite, a tetraalkylammonium acetate, or a combination comprising at least one of the foregoing catalysts, wherein each alkyl is independently a $C_{1-6}$ alkyl. In a specific embodiment, a useful redistribution catalyst is a tetra $C_{1-6}$ alkylphosphonium hydroxide, $C_{1-6}$ alkyl phosphonium phenoxide, or a combination comprising one or more of the foregoing catalysts. An exemplary redistribution catalyst is tetra-n-butylphosphonium hydroxide.

In an embodiment, the redistribution catalyst is present in an amount of 40 to 120 ppm, specifically 40 to 110 ppm, and more specifically 40 to 100 ppm, by weight based on the weight of the poly(aliphatic ester)-polycarbonate.

Polycarbonates as broadly defined above may further include blends of the above polycarbonates with polyesters. Useful polyesters may include, for example, polyesters having repeating units of formula (9), which include poly(alkylene dicarboxylates), liquid crystalline polyesters, and polyester copolymers. The polyesters described herein are generally completely miscible with the polycarbonates when blended.

Such polyesters generally include aromatic polyesters, poly(alkylene esters) including poly(alkylene arylates), and poly(cycloalkylene diesters). Aromatic polyesters may have a polyester structure according to formula (9), wherein D and T are each aromatic groups as described hereinabove. In an embodiment, useful aromatic polyesters may include, for example, poly(isophthalate-terephthalate-resorcinol) esters, poly(isophthalate-terephthalate-bisphenol A)esters, poly[(isophthalate-terephthalate-resorcinol) ester-co-(isophthalate-terephthalate-bisphenol A)]ester, or a combination comprising at least one of these. Also contemplated are aromatic polyesters with a minor amount, e.g., about 0.5 to about 10 wt %, based on the total weight of the polyester, of units derived from an aliphatic dicarboxylic acid and/or an aliphatic polyol to make copolyesters. Poly(alkylene arylates) may have a polyester structure according to formula (9), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene) dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly (cyclohexanedimethylene terephthalate) (PCT). Combinations comprising at least one of the foregoing polyesters may also be used.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (10):

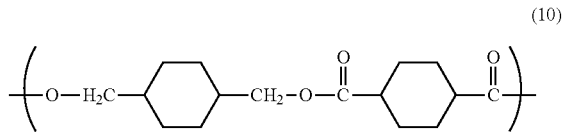

wherein, as described using formula (9), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Polyester-polycarbonate copolymers generally may have a weight average molecular weight ($M_w$) of 1,500 to 100,000 g/mol, specifically 1,700 to 50,000 g/mol. In an embodiment, poly(aliphatic ester)-polycarbonates have a molecular weight of 15,000 to 45,000 g/mol, specifically 17,000 to 40,000 g/mol, more specifically 20,000 to 30,000 g/mol, and still more specifically 20,000 to 25,000 g/mol. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

A polyester-polycarbonate may in general have an MVR of about 5 to about 150 cc/10 min., specifically about 7 to about 125 cc/10 min, more specifically about 9 to about 110 cc/10 min, and still more specifically about 10 to about 100 cc/10 min., measured at 300° C. and a load of 1.2 kilograms according to ASTM D1238-04 or ISO 1133. Commercial polyester blends with polycarbonate are marketed under the trade name XYLEX®, including for example XYLEX® X7300, and commercial polyester-polycarbonates are marketed under the tradename LEXAN® SLX polymers, including for example LEXAN® SLX-9000, and are available from SABIC Innovative Plastics (formerly GE Plastics).

In an embodiment, the poly(aliphatic ester)-polycarbonates have an MVR of about 2 to about 25 cc/10 min, measured at 250° C. and under a load of 1.2 kilograms and a dwell time of 6 minutes, according to ASTM D1238-04. Also in an embodiment, the poly(aliphatic ester)-polycarbonates have an MVR of about 2 to about 25 cc/10 min, measured at 250° C. and under a load of 1.2 kilograms and a dwell time of 4 minutes, according to ISO 1133. In a specific embodiment, poly(aliphatic ester)-polycarbonates have an MVR of about 13 to about 25 cc/10 min, and more specifically about 15 to about 22 cc/10 min, measured at 250° C. and under a load of 1.2 kilograms and a dwell time of 6 minutes, according to ASTM D1238-04. Also in a specific embodiment, poly(aliphatic ester)-polycarbonates have an MVR of about 13 to about 25 cc/10 min, and more specifically about 15 to about 22 cc/10 min, measured at 250° C. and under a load of 1.2 kilograms and a dwell time of 4 minutes, according to ISO 1133.

In an embodiment, the thermoplastic composition comprises poly(aliphatic ester)-polycarbonate in an amount of 50 to 100 wt %, based on the total weight of poly(aliphatic ester)-polycarbonate and any added polycarbonate. In a specific embodiment, the thermoplastic composition comprises only poly(aliphatic ester)-polycarbonate. In another specific embodiment, the thermoplastic comprises poly(aliphatic ester)-polycarbonate that has been reactively extruded to form a reaction product. In another specific embodiment, the thermoplastic comprises a blend of poly(aliphatic ester)-polycarbonate that has been reactively extruded.

Polycarbonates, as defined above, also include a polysiloxane-polycarbonate copolymer. The polysiloxane (also referred to herein as "polydiorganosiloxane") blocks of the copolymer comprise repeating siloxane units (also referred to herein as "diorganosiloxane units") of formula (11):

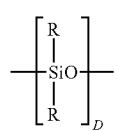
(11)

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (11) may vary widely depending on the type and relative amount of each component in the thermoplastic composition, the desired properties of the composition, and like considerations. Generally, D may have an average value of 2 to 1,000, specifically 2 to 500, more specifically 5 to 100. In some applications, D may have an average value of 30 to 60. An exemplary siloxane block may have an average D value of 45.

Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (12):

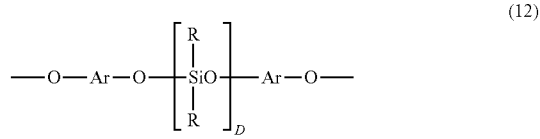
(12)

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Useful Ar groups in formula (12) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of dihydroxyarylene compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (12) may be derived from the corresponding dihydroxy compound of formula (13):

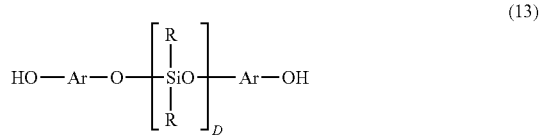
(13)

wherein R, Ar, and D are as described above. Compounds of formula (13) may be obtained by the reaction of a dihydroxyarylene compound with, for example, an alpha, omega-bisacetoxypolydiorangonosiloxane under phase transfer conditions.

In another embodiment, polydiorganosiloxane blocks comprise units of formula (14):

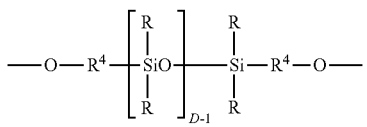
(14)

wherein R and D are as described above, and each occurrence of $R^4$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (15):

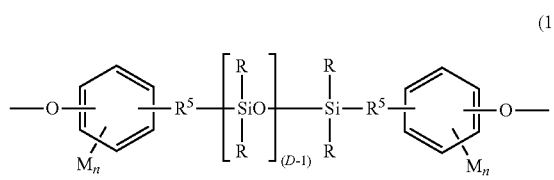
(15)

wherein R and D are as defined above. Each $R^5$ in formula (15) is independently a divalent $C_2$-$C_8$ aliphatic group. Each M in formula (15) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^5$ is a divalent $C_1$-$C_3$ aliphatic group, and R is methyl.

Units of formula (15) may be derived from the corresponding dihydroxy polydiorganosiloxane (15a):

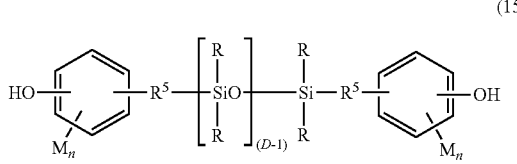
(15a)

wherein R, D, M, $R^5$, and n are as described above. Such dihydroxy polysiloxanes can be made by effecting a platinum catalyzed addition between a siloxane hydride of formula (16):

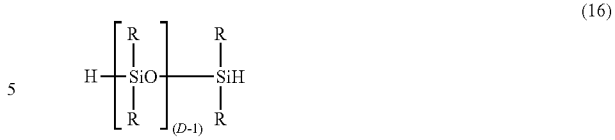
(16)

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

Polysiloxane-polycarbonates comprise 50 to 99.9 wt % of carbonate units and 0.1 to 50 wt % siloxane units, based on the total weight of the polysiloxane-polycarbonate. Specific polysiloxane-polycarbonate copolymers comprise 90 to 99 wt %, specifically 75 to 99 wt %, of carbonate units and 1 to 25 wt %, specifically 1 to 10 wt %, siloxane units. An exemplary polysiloxane-polycarbonate copolymer may comprise about 6 wt % siloxane units. Another exemplary polysiloxane-polycarbonate comprises about 20 wt % siloxane units. All references to weight percent compositions in the polysiloxane-polycarbonate are based on the total weight of the polysiloxane-polycarbonate.

Exemplary polysiloxane-polycarbonates comprise polysiloxane units derived from dimethylsiloxane units (e.g., formula (12) where R is methyl), and carbonate units derived from bisphenol A, e.g., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000 g/mol, specifically 5,000 to 50,000 g/mol. Some specific polysiloxane-polycarbonates have, for example, a weigh average molecular weight of 15,000 to 45,000 g/mol. Molecular weights referred to herein are as measured by gel permeation chromatography using a crosslinked styrene-divinyl benzene column, at a sample concentration of about 1 milligram per milliliter, and as calibrated with polycarbonate standards.

The polysiloxane-polycarbonate can have a melt volume flow rate, measured at 300° C. under a load of 1.2 kg, of 1 to 50 cc/10 min, specifically 2 to 30 cc/10 min. Specific polysiloxane-polycarbonates can have a melt volume rate measured at 300° C. under a load of 1.2 kg, of 5 to 15 cc/10 min. Mixtures of polysiloxane-polycarbonates of different flow properties may be used to achieve the overall desired flow property. Commercial polysiloxane-polycarbonates are marketed under the trade name LEXAN® EXL polycarbonates, available from SABIC Innovative Plastics (formerly GE Plastics).

Where included, the thermoplastic composition may comprise polycarbonate, including blends of polycarbonate homo and/or copolymers, polyesters, polyester-polycarbonates other than the poly(aliphatic ester)-polycarbonates disclosed above, or polysiloxane-polycarbonate in an amount of less than or equal to 50 wt %, specifically 1 to 50 wt %, and more specifically 10 to 50 wt %, based on the total weight of poly(aliphatic ester)-polycarbonate and any added polycarbonate, provided the addition of the polycarbonate does not significantly adversely affect the desired properties of the thermoplastic composition.

The thermoplastic composition disclosed herein comprises a poly(aliphatic ester)-polycarbonate. The thermoplastic composition may further include a polycarbonate different from the poly(aliphatic ester)-polycarbonate.

Surprisingly, a high flow, ductile, transparent thermoplastic composition comprising a poly(aliphatic ester)-polycarbonate copolymer, as described above, meets or exceeds the desired performance requirements (i.e., transparency, and an MVR of up to 25 cc/10 min at 300° C. under a load of 1.2 kg). The poly(aliphatic ester)-polycarbonate copolymer, i.e., a polycarbonate having aliphatic dicarboxylic acid ester soft block units randomly incorporated along the copolymer chain, has a soft block segment (e.g., a flexible chain of repeating —$CH_2$— units) in the polymer chain, where inclusion of these soft block segments in a polycarbonate reduces the glass transition temperatures (Tg) of the resulting soft block-containing polycarbonate copolymer. These thermoplastic compositions, comprising soft block in amounts of 0.5 to 10 wt % of the weight of the poly(aliphatic ester)-polycarbonate, are transparent and have higher MVR than polycarbonate homopolymers or copolymers without the soft block.

While the soft block units of the poly(aliphatic ester)-polycarbonate copolymers may not be specifically limited to the alpha, omega $C_{6-20}$ dicarboxylic acids disclosed herein, it is believed that shorter soft block chain lengths (less than $C_6$, including the carboxylic acid groups) may not provide sufficient chain flexibility in the poly(aliphatic ester)-polycarbonate to increase the MVR to the desired levels (i.e., greater than or equal to about 13 cc/10 min at 250° C. and 1.2 kg load); likewise, increasing the soft block chain lengths (greater than $C_{20}$, including the carboxylic acid groups) may result in creation of crystalline domains within the poly(aliphatic ester)-polycarbonate composition, which in turn can lead to phase separation of the domains that can manifest as reduced transparency and increased haze, and may affect the thermal properties such as Tg (where multiple Tg values may result for different phase separated domains) and MVR (decreasing MVR to values of less than about 13 cc/10 min at 250° C. and 1.2 kg load).

In some embodiments of the thermoplastic composition, the poly(aliphatic ester)-polycarbonate is used directly as prepared by interfacial or melt-processing methods. However, in some alternate embodiments, where the poly(aliphatic ester)-polycarbonate may have inadequately low melt flow (i.e., less than about 13 cc/10 min at 250° C. and 1.2 kg load) and therefore may not fully fill the mold, the poly(aliphatic ester)-polycarbonate may further be processed by reactive extrusion with a redistribution catalyst, such as for example, a tetra-n-butyl phosphonium hydroxide solution in water (up to 40% by weight). Surprisingly, poly(aliphatic ester)-polycarbonates which otherwise have desirable impact strength and transparency but with insufficiently high melt flow may, by the action of the redistribution catalyst, form a reaction product with higher melt flow (i.e., greater than 13 cc/10 min at 250° C. and 1.2 kg), without significant loss of other desired features of the thermoplastic and the lens articles prepared therefrom such as impact strength, low birefringence, mold-filling and mold-release capability, high visible light transparency (percent transmittance) of greater than 85%, and less than 1% haze, measured at 3.2 mm thickness.

Exemplary thermoplastic compositions include poly(sebacic acid ester)-co-(bisphenol A carbonate). It will be understood that a wide variety of thermoplastic compositions and articles derived from them can be obtained by not only changing the thermoplastic compositions (e.g., by replacing sebacic acid with adipic acid in the poly(sebacic acid ester)-co-(bisphenol A carbonate) but by changing the amounts of sebacic acid content in the blends while maintaining a constant molecular weight. Similarly, new thermoplastic compositions may be identified by changing the molecular weights of the components in the exemplary copolymer blends while keeping, for example, sebacic acid content constant.

In particular, the ductility, transparency and melt flow of the thermoplastic compositions may be varied by the composition of the poly(aliphatic ester)-polycarbonate. For example, wt % of aliphatic dicarboxylic acid ester units (e.g., sebacic acid) may be varied from 1 to 10 wt % of the total weight of the thermoplastic composition of the total weight of the thermoplastic composition. The distribution (in the polymer chain) of the sebacic acid (or other dicarboxylic acid ester) in the copolymers may also be varied by choice of synthetic method of the poly(aliphatic ester)-polycarbonate copolymers (e.g., interfacial, melt processed, or further reactive extrusion of a low MVR poly(aliphatic ester)-polycarbonate with a redistribution catalyst) to obtain the desired properties. In this way, thermoplastic compositions having high flow (e.g. MVR of up to 25 cc/10 min. at 1.2 kg and 250° C.) may further be achieved where the poly(aliphatic ester)-polycarbonate is too low in MVR, or is opaque (where the soft blocks are too great in length, the concentration of the soft block in the copolymer is too high, or where the overall molecular weight of the copolymer is too high, or where the copolymer has a block architecture in which the soft block units in the copolymer aggregate to form larger blocks), while transparent products with greater than or equal to 85% transmission, haze of less than 1% (measured on a 3.2 mm thick molded plaque), and high flow (e.g., up to an MVR of 25 cc/10 min. at 1.2 kg and 250° C.), and ductility may be obtained. Thermoplastic compositions having this combination of properties is not obtainable from polycarbonate compositions of, for example, bisphenol A polycarbonate homopolymer absent a poly(aliphatic ester)-polycarbonate copolymer.

The thermoplastic composition thus comprises poly(aliphatic ester)-polycarbonate copolymer, and optionally a polycarbonate polymer not identical to the poly(aliphatic ester)-polycarbonate. Such added polycarbonate polymer may be included but is not essential to the thermoplastic composition. In an embodiment, where desired, the thermoplastic composition may include the polycarbonate in amounts of less than or equal to 50 wt %, based on the total weight of poly(aliphatic ester)-polycarbonate and any added polycarbonate. Specifically useful in the thermoplastic polymer include homopolycarbonates, copolycarbonates, polyester-polycarbonates, polysiloxane-polycarbonates, blends thereof with polyesters, and combinations comprising at least one of the foregoing polycarbonate-type resins or blends. It should further be noted that the inclusion of other polymers such as polycarbonate is permitted provided the desired properties of the thermoplastic composition are not significantly adversely affected. In a specific embodiment, a thermoplastic composition consists essentially of a poly(aliphatic ester)-polycarbonate copolymer. In another specific embodiment, the thermoplastic composition consists of a poly(aliphatic ester)-polycarbonate copolymer.

In addition to the poly(aliphatic ester)-polycarbonate copolymer and any added polycarbonate polymer as described hereinabove, the thermoplastic composition can further include various other non-essential additives ordinarily incorporated with thermoplastic compositions of this type, where the additives are selected so as not to significantly adversely affect the desired properties of the thermoplastic composition. Mixtures of additives may be used. Such additives may be mixed at a suitable time during the mixing of the components for forming the thermoplastic composition.

Useful additives contemplated herein include, but are not limited to, colorants including dyes and pigments, antioxidants, heat stabilizers, light and/or UV light stabilizers, plasticizers, lubricants, mold release agents, flame retardants, antistatic agents, anti-drip agents, radiation (gamma) stabilizers, and the like, or a combination comprising at least one of the foregoing additives. While it is contemplated that other resins and or additives may be used in the thermoplastic compositions described herein, such additives while desirable in some exemplary embodiments are not essential.

In an embodiment, the thermoplastic composition has an MVR of about 2 to about 25 cc/10 min, and more specifically about 3 to about 22 cc/10 min, measured at 250° C. and under a load of 1.2 kilograms at a dwell time of 6 minutes according to ASTM D1238-04. Also in an embodiment, the thermoplastic composition has an MVR of about 2 to about 25 cc/10 min, and more specifically about 3 to about 22 cc/10 min, measured at 250° C. and under a load of 1.2 kilograms at a dwell time of 4 minutes according to ISO 1133.

In an embodiment, the thermoplastic composition has an MVR of about 13 to about 25 cc/10 min, and more specifically about 15 to about 22 cc/10 min, measured at 250° C. and under a load of 1.2 kilograms at a dwell time of 6 minutes according to ASTM D1238-04. Also in an embodiment, the thermoplastic composition has an MVR of about 13 to about 25 cc/10 min, and more specifically about 15 to about 22 cc/10 min, measured at 250° C. and under a load of 1.2 kilograms at a dwell time of 4 minutes according to ISO 1133.

In an embodiment, the thermoplastic composition, when molded into an article having a thickness of 3.2 mm, has a percent transmittance of greater than 85%, specifically greater than or equal to 87%, more specifically greater than or equal to 89%, and still more specifically greater than or equal to 90%, according to ASTM D1003-00.

In an embodiment, the thermoplastic composition, when molded into an article having a thickness of 3.2 mm, has a haze of less than or equal to 1%, specifically less than or equal to 0.95%, and more specifically less than or equal to 0.9% according to ASTM D1003-00.

In an embodiment, the thermoplastic composition, when molded into an article having a thickness of 3.2 mm, has a yellowness index (YI) of less than 4, specifically less than 3, and more specifically less than 2.5, when measured according to ASTM D1925-70.

The thermoplastic composition may be manufactured by methods generally available in the art, for example, in one embodiment, in one manner of proceeding, powdered poly (aliphatic ester)-polycarbonate copolymer, any added polycarbonate, and other additives as desired are first mixed in a HENSCHEL MIXER® high speed mixer. Other low shear processes including but not limited to hand mixing may also accomplish this blending. The blend is then fed into the throat of an extruder via a hopper. Alternatively, one or more of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow, but at which temperature components of the thermoplastic composition do not decompose so as to significantly adversely affect the composition. The extrudate is immediately quenched in a water bath and pelletized. The pellets, so prepared when cutting the extrudate, may be one-fourth inch long or less as desired. Such pellets may be used for subsequent molding, shaping, or forming.

In a specific embodiment, a method of preparing a thermoplastic composition comprises melt combining a poly(aliphatic ester)-polycarbonate copolymer, polysiloxane-polycarbonate copolymer, and any added polycarbonate. The melt combining can be done by extrusion. In an embodiment, the proportions of poly(aliphatic ester)-polycarbonate copolymer, polysiloxane-polycarbonate copolymer, and any added polycarbonate are selected such that the resultant composition maximizes the melt volume rate (MVR) while not significantly adversely affecting low temperature NII and ductility. In a further specific embodiment, the thermoplastic polymer comprises a polycarbonate-type polymer (in addition to and not identical to the poly(aliphatic ester)-polycarbonate) as defined hereinabove.

In a specific embodiment, the compounding extruder is a twin-screw extruder. The extruder is typically operated at a temperature of 180 to 385° C., specifically 200 to 330° C., more specifically 220 to 300° C., wherein the die temperature may be different. The extruded thermoplastic composition is quenched in water and pelletized.

The thermoplastic composition can be provided as pellets, and is useful to form articles for use in devices such as lenses for use in portable electronics applications including cell phones, cameras, personal digital assistants, DVD players and recording devices, and the like. In an embodiment, the thermoplastic compositions may be molded into useful shaped articles by injection molding. Desirably, the thermoplastic composition has excellent mold filling capability due to its high flow properties.

Products (e.g., articles) made from the thermoplastic composition(s) can specifically be used in a variety of applications including thin-wall articles, where transparency, precision as defined by a high degree of reproducibility, retention of mechanical properties including impact strength, and precise optical properties are required. Such a thermoplastic composition would reduce the residual stress in the molded article due to the improved flow.

In an embodiment, the thermoplastic composition is used in the manufacture of optical lenses including camera lenses, e.g., for mobile telephone cameras, and for digital still photography cameras; and automotive camera lenses. For applications in which a lens set is required, such as for camera lenses, one or more of these optical lenses may be manufactured using the thermoplastic composition. It has surprisingly been found that use of the thermoplastic composition, which has improved flow (MVR) for excellent mold filling properties but which maintains desirable mechanical properties can, in the manufacture of such lenses, provide a high degree of reproducibility for successive lenses molded from the thermoplastic composition.

A method of manufacturing the lenses is also disclosed. During the molding process the replication of the molded lens needs to be very accurate to the specifications for the lens, and consistently reproducible lens-to-lens; otherwise, lenses which do not meet the reproducibility standards will give blurred images. In an embodiment, a method of manufacturing an optical lens (such as a camera lens) as prepared from the thermoplastic composition provides lenses having precision dimensions that deviate by less than 400 nm from a reference standard when measured by three dimensional contact profilometry. In a further embodiment, successive optical lenses prepared from the thermoplastic each have precision dimensions that deviate by less than 400 nm from a reference standard when measured by three-dimensional contact measurement.

The optical lenses disclosed herein are defined by several dimensional features. In an embodiment, the size of the lens is characterized by the term "Effective Lens Area", which is defined as the area of the lens where the curvature is positive, and hence light which is refracted through this area is usable in actual imaging. "Curvature" as defined herein, is the reciprocal of the optical radius of the lens (as defined by the light path). For example a flat surface has infinite radius and therefore zero curvature. Lenses such as those described herein include a flat portion around the periphery of the lens, which is used for mounting the lens into the optical assembly. This flat portion is not considered part of the effective lens area. A typical lens has at least two surfaces, a first and a second surface. On the first (incident) surface, light enters the lens and exits through the second (refractive) surface. One or both of theses surfaces may have a curvature. The effective lens area as defined above may be the same for the first and second surfaces, or may be different for the first and second surfaces. Where different, the larger value of the effective surface area for the first and second surfaces is considered to be the effective lens area for the overall lens.

In an embodiment, an optical lens has an Effective Lens Area (ELA) of 0.5 mm$^2$ to 100 mm$^2$. In a specific embodiment, an optical lens has an ELA of 0.5 mm$^2$ to 10 mm$^2$, where in a more specific embodiment, the optical lenses may be used for camera lenses and automotive lenses. In another specific embodiment, an optical lens has an ELA of 5 mm$^2$ to 100 mm$^2$, where in another more specific embodiment, the optical lenses may be used for digital still camera lenses.

ELA diameter as defined herein describes the diameter measured at the outermost periphery of the effective (optically useable) area of the lens; whereas overall diameter of the lens is the diameter which includes the non-optically relevant flat portion. For example, a mobile phone camera lens typically has a 2.3 mm diameter for effective area. To further illustrate the relationship between lens diameter and Effective Lens Area (ELA), for a lens of 2 mm in diameter, the ELA would be 3.1 mm$^2$; for a lens of 8 mm in diameter, the ELA would be 50.3 mm$^2$; for a lens of 10 mm in diameter, the ELA would be 78.5 mm$^2$; and for a lens of 12 mm in diameter, the ELA would be 113.1 mm$^2$.

The optical lenses may also be characterized by their thicknesses. Lens thickness, as defined herein, is measured at the center of the lens (i.e., along the z axis, orthogonal to the diameter of the lens which is measured in the x-y plane of the lens). Since lenses have curvature, the thickness of the lens may vary along the contour of the surface. Also, depending upon the type of the lens (convex, concave, etc.) the variation of the thickness can differ widely. In an embodiment, the optical lens has a thickness of 0.25 to 2.5 mm, specifically 0.5 to 2.4 mm, and more specifically 0.8 to 2.3 mm, measured at the center of the lens.

Exemplary lens types (by application), and the interrelationship of different dimensions of the Effective Lens Area (ELA), the diameter of the ELA (i.e., the measured diameter of the optically useful portion of the lens defined by the ELA), overall diameter (i.e., the overall diameter of the peripheral flat portion and the diameter of the Effective Lens Area) and the thickness of the lens, are illustrated in the Table 1, below.

TABLE 1

| Lens type | Effective Lens Area (ELA; mm$^2$) | Diameter of ELA (mm) | Overall Diameter of molded lens (mm) | Lens Thickness (center, in mm) |
| --- | --- | --- | --- | --- |
| Mobile phone camera lens | 4.2 | 2.3 | 6.4 | 0.66 |
| Mobile phone camera lens | 3.5 | 2.1 | 4.8 | 1.05 |
| Mobile phone camera lens | 0.8 | 1 | 3.5 | 0.48 |
| Automotive Camera lens | 22.1 | 5.3 | 7.7 | 1.57 |
| Automotive Camera lens | 16.6 | 4.6 | 7 | 2.38 |

The lenses described hereinabove may have any useful shape within the constraints of the effective areas and thicknesses defined hereinabove. For example, the camera lens may be a spherical or aspherical lens having a focal point. A spherical lens may be, for example, a double-convex lens, double-concave lens, plano-convex lens, plano-concave lens, meniscus convex lens or meniscus concave lens. Alternatively, an aspherical lens has an ellipsoidal, hyperbolic, or parabolic face.

Also surprisingly, the birefringence of the optical lenses is significantly lower than that of comparable lenses prepared using polycarbonate without the soft block. Without wishing to be bound by theory, it is believed that the additional flexibility in the polymer chain of the poly(aliphatic ester)-polycarbonate provides for more randomized orientation during flow into the mold of the molding machine, where the chains of less flexible polymers (such as, for example, bisphenol A homopolymer) may orient to the direction of extrusion (flow). Such randomization of orientation may therefore minimize intra- and interchain ordering, which in turn decreases the polarizing effect and hence, reduces birefringence in the resulting optical lens. To obtain acceptable replication and birefringence of a molded lens, the mold temperature is desirably from 115 to 135° C., the cylinder temperature is 300 to 340° C., and the cooling time is between 45 and 75 seconds.

Thus, in an embodiment, an optical lens molded at a mold temperature of 120° C., a cylinder temperature of 310° C., and a holding pressure of 80 MPa for 0.8 seconds, has an averaged birefringence of less than 81 nm, specifically less than 76 nm, and more specifically less than 73 nm measured at a wavelength of 590 nm according to the Parallel Nicols method. In a specific embodiment, an optical lens molded from the thermoplastic composition has surface variation that is within a 400 nm (0.4 micrometer) overall tolerance measured by three dimensional contact profilometry, and also has an average retardation of less than 76 nm, specifically less than 73 nm, measured at a wavelength of 590 nm according to the Parallel Nicols method. In another embodiment, an optical lens molded from the thermoplastic composition has a birefringence that is lower than the birefringence of an optical lens molded from an optical quality bisphenol A polycarbonate having a melt volume rate of about 11 cc/10 min at 250° C. and under a load of 1.2 kg and a dwell time of 6 minutes, according to ASTM D1238-04.

While specific applications and articles are disclosed herein, one skilled in the art will appreciate that the applications of the thermoplastic compositions herein should not be considered as limited to these applications.

The thermoplastic composition is further illustrated by the following non-limiting examples.

All thermoplastic compositions for the examples (abbreviated Ex. in the following Tables) and comparative examples (abbreviated CEx. in the following Tables) were prepared using one or more of the following components listed in Table 2.

TABLE 2

| Component | Description | Source |
|---|---|---|
| PAE-PC-1 | 6 wt % Sebacic acid-co-Bisphenol A polycarbonate (polyester-polycarbonate copolymer with p-cumylphenol (PCP) endcap), MVR = 19 cc/10 min at 250° C. under 1.2 kg load and 6 minute dwell time, Mw = 18,300 g/mol | SABIC Innovative Plastics |
| PAE-PC-2 | 6 wt % Sebacic acid-co-Bisphenol A polycarbonate (polyester-polycarbonate copolymer with p-cumylphenol (PCP) endcap), MVR = 13.8 cc/10 min at 250° C. under 1.2 kg load and 6 minute dwell time, Mw = 19,500 g/mol | SABIC Innovative Plastics |
| OQ-PC | Optical Quality (OQ) Bisphenol A Polycarbonate (with phenol endcap), MVR = 11 cc/10 min at 250° C. under 1.2 kg load and 6 minute dwell time, Mw = 18,100 g/mol | SABIC Innovative Plastics |
| GMS | Glycerol Monostearate, available as PATIONIC ® 901 and as Rikenmal S-100A | Caravan Ingredients or Riken Vitamin Co. Ltd. |
| Stabilizer | DOVERPHOS ® S-9228 | Dover Chemical |
| TBPH | Tetra-n-butyl phosphonium hydroxide, 40 wt % aqueous solution | Sachem Chemical Co. |

Compounded thermoplastic compositions were compounded on a Werner and Pfleiderer ZSK 25-mm twin-screw extruder operating at a barrel temperature of from 40-200-225-250-260-260-260-260° C. at a feed rate of 20 kg/h and a screw speed of 350 rpm. The twin-screw extruder had enough distributive and dispersive mixing elements to produce good mixing of the thermoplastic compositions. The compositions were subsequently dried at about 120° C. for 4 hours and then molded on a Husky or BOY injection-molding machine using barrel temperature of 255-260-250-240° C. and mold temperatures of 70 or 90° C., and cooled for 30 seconds.

Thermoplastic compositions were molded into 14 mm outside diameter (OD) lenses as follows. The thermoplastic compositions were loaded into a Nihon Yuki HF1 Hungry-Feeder single-screw extruder operating at a cylinder temperature of 300 to 340° C., and were fed to a FANUC ROBOSHOT S-2000i 50B, 500 kilo-Newton (50 ton-force) injection-molding machine with a maximum injection speed of 330 mm/sec for optical applications, operating at a mold temperature of 115 to 135° C. Drying was accomplished using a 44-liter Matsui MCAX-140-J medium temperature controller operating at 60 to 200° C. with a 10 micrometer filter, and a nitrogen purge using a Taiyo Nissan M-10 nitrogen generator providing a nitrogen purity of 99.99%, and were cooled for 60 seconds. The molded lenses were removed by a Yushin HopFive 450 Runner Take-out Robot with a 450 mm stroke and 60°-90° swing angle. All lenses were molded in a Class 10,000 clean room environment. It will be recognized by one skilled in the art that the extrusion and molding methods are not limited to these temperatures.

Properties of the thermoplastic compositions were determined herein as follows. Melt Volume Rate (MVR) was determined at 250° C. under a load of 1.2 kg, and at a dwell time of 4 minutes or 12 minutes according to ISO 1133, or 6 minutes according to ASTM D1238-04, and is reported in units of cc/10 min. Molecular weight of polymers (Mw) was determined using gel permeation chromatography using a crosslinked styrene-divinylbenzene column, a sample concentration of about 1 mg/ml, and an elution rate of toluene or chloroform eluent of 0.5 to 1.5 ml/min, and calibrated to polycarbonate standards.

Glass transition temperature (Tg, at half heat capacity, in ° C.) was determined from the second heat using a differential scanning calorimeter (DSC) operating at a temperature ramp rate of 10° C./min. Heat distortion/deflection temperature (HDT) (° C.) was determined edgewise at 1.8 MPa according to ASTM D648-06.

Notched Izod impact (NII) and unnotched Izod impact (UNI) testing was determined on 80 mm×10 mm×3 mm molded samples (bars) according to ASTM D256-04 or ISO 180, at temperature of 23° C., where the NII and UNI impact strengths are each reported in units of kilojoules per square meter (kJ/m$^2$).

Multi Axial Impact (MAI) reported in Newtons (N), energy at maximum deflection and at break both reported in Joules (J), deflection at break (mm), and failure mode were determined using 3.2 mm disks according to ISO 6602 or ASTM D3763. Tensile modulus (MPa), tensile stress at break (MPa) and tensile strain (%) were each determined for molded articles according to ISO 527 at a temperature of 23° C. Vicat softening temperature is reported in degrees Centigrade (° C.), according to ASTM D1525.

Color capability was performed using a ColorEye™ 7000A spectrophotometer manufactured by Gretagmacbeth. The CIE (L*, a*, b*) value was determined on 3.2 mm color chips under reflectance mode according to ASTM 6290, and calibrated using a high gloss polycarbonate standard at a white pigment (TiO$_2$) loading of 5 wt %. The color capability was determined from the absorbance spectral data according to the CIELAB color measurement method detailed by CIE (Commission Internationale de l'Eclairage). The values of E*, L*, a* and b* are reported for the Examples tested.

Haze (%) and light transmission (%) were each determined using 3.2 mm molded plaques according to ASTM D1003-00. Yellowness index (YI) was determined according to ASTM D1925-70.

Relationship of Poly(aliphatic ester)-polycarbonate composition to Glass Transition Temperature. For soft-block copolymer materials, the glass transition temperature depends on the percent soft-block monomer as well as the molecular weight. FIG. 1 is a plot of glass transition temperature versus percent soft block (sebacic acid) for poly(aliphatic ester)-polycarbonates. The plot illustrates the variation in glass transition temperature for different poly(aliphatic ester)-polycarbonates (0.5, 2, 4, 6, 8, 10, and 12 wt % sebacic acid content), where Tg exhibits a linear decrease as a function of increasing soft block content for the copolymer. The weight average molecular weight was maintained at about 18,000 g/mol for each of these samples. Further experimentation was carried out for the Example below on a material comprising 6 wt % sebacic acid.

Table 3 shows compositional information and properties tested according to the above methods for Comparative Example 1 and Example 1, as described below.

TABLE 3

| Component | CEx. 1 | Ex. 1 |
|---|---|---|
| PAE-PC-1 (wt %) | — | 100 |
| OQ-PC (wt %) | 100 | — |
| MVR 250° C., 1.2 kg load, 6 min. dwell (cc/10 min) | 11 | 19 |
| Tg (° C.) | 143 | 130 |
| HDT (1.8 MPa. edgewise) (° C.) | 124 | 110 |
| NII (23° C.) (kJ/m$^2$) | 44 | 56 |
| UNI (23° C.) (kJ/m$^2$) | NB | NB |
| MAI (23° C.) (N) | 7,960 | 8,350 |
| Energy@max (J) | 82 | 94 |
| Energy@break (J) | 87 | 102 |
| Deflection@ break (mm) | 17 | 20 |
| Failure Mode | 2D | 4D |
| Tensile Modulus (MPa) | 2,350 | 2,300 |
| Tensile Stress@break - avg. (MPa) | 50 | 50 |
| Tensile Strain@break - avg. (%) | >60 | >60 |
| Transmittance (%) | 91.6 | 90.7 |
| Haze (%) | 0.4 | 0.8 |
| Yellowness Index | 1.2 | 3.6 |

Table 3 shows compositional information and properties tested according to the above methods for the thermoplastic compositions of Example 1 (Ex. 1) and Comparative Example 1 (CEx. 1), prepared from PAE-PC-1 and BPA-PC found in Table 2.

In the properties of the thermoplastic compositions shown in Table 3, it can be seen that the viscosity of the thermoplastic compositions of Example 1 and Comparative Example 1, is significantly lower (i.e., a higher MVR value, measured at 250° C., 1.2 kg load, and 6 min. dwell time, of 19 cc/10 min) for the PAE-PC-1 relative to the OQ-PC material (MVR of 11 cc/10 min, identical measurement conditions). For BPA-polycarbonate resins such as OQ-PC, it is known that an increase in MVR is also accompanied by a reduction in impact performance.

While the thermal performance (Tg) shows a modest decrease for the PAE-PC-1 of Example 1, which is not unexpected in view of the increase in MVR for this composition, the mechanical properties of the PAE-PC-1 of Example 1 can be seen to be comparable with those of the OQ-PC of Comparative Example 1.

Figure 4:
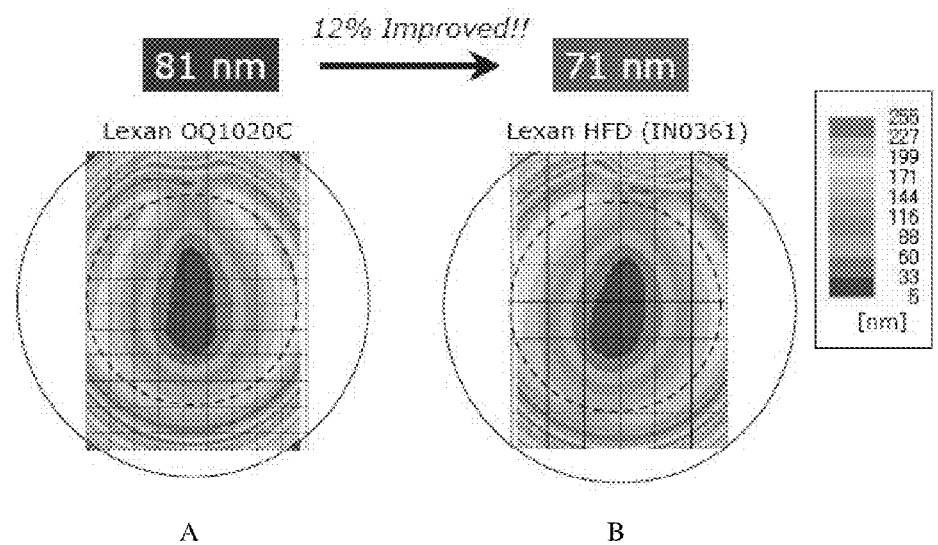
FIG. 4 shows birefringence color contour maps of (A) a lens prepared using a polycarbonate, and (B) for a lens prepared using a poly(aliphatic ester)-polycarbonate.

The birefringence measurements of the lenses exhibiting the best replication are as described below for FIG. 4.

Figure 2A:
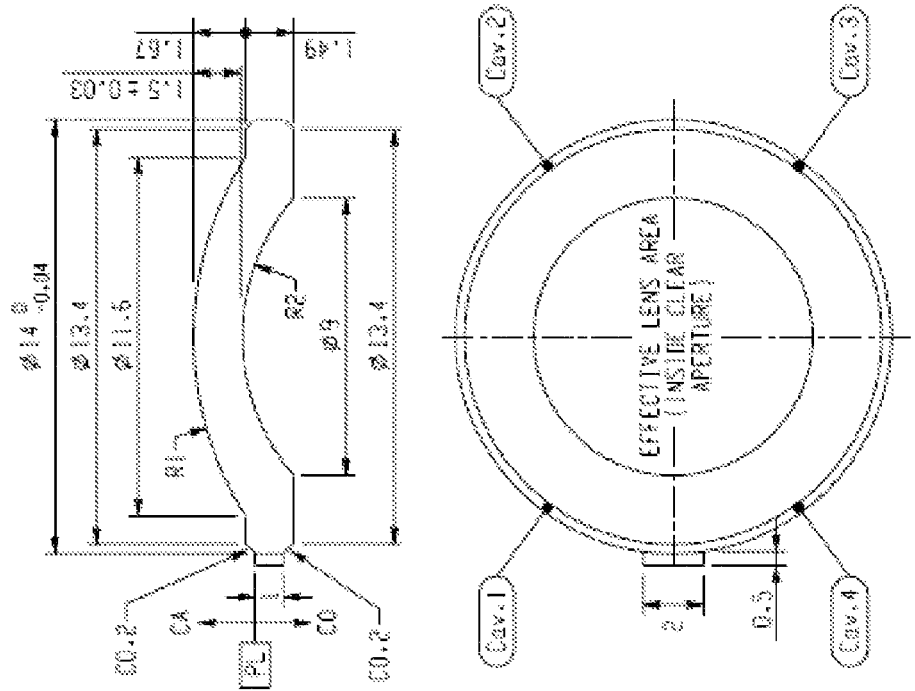
FIG. 2A is a schematic diagram of an exemplary lens molded from the thermoplastic compositions.
Figure 2B:
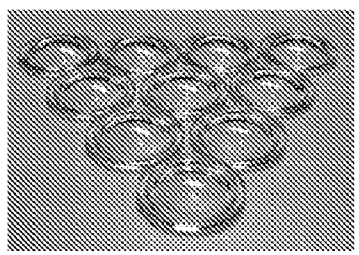
FIG. 2B is a photograph of molded lenses.

The molding replication performance of a commercially available, high flow, optical grade material (OQ-PC) was compared with that of a poly(aliphatic ester)-polycarbonate (PAE-PC-1). Aspherical lenses (meniscus lenses) as test articles, having an effective aperture diameter (Φ) of 14 mm and a thickness of 1.5 mm, were molded from each of these materials using an aspherical lens molding tool capable of producing bi-concave or meniscus lenses. A schematic diagram of the sample lens molded using this tool is shown in FIG. 2A, and a photograph showing 10 exemplary lenses molded using this tool is seen in FIG. 2B.

Figure 3:
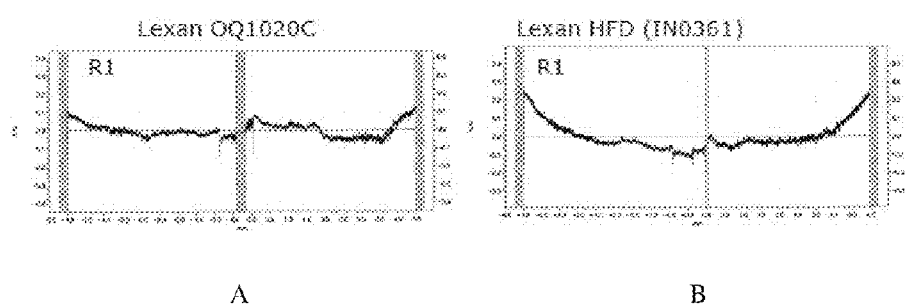
FIG. 3 shows (A) a surface profile of a lens prepared using a polycarbonate, and (B) for a lens prepared using a poly(aliphatic ester)-polycarbonate.

Replication of lenses during molding. Replication (i.e., lens-to-lens reproducibility in conformity with a set of measurement standards) was determined using a Taylor-Hobson Form TALYSURF® PGI profilometer, with a 120 or 200 mm traverse unit, gauge range from 12.5 mm, a 0.8 nm to 12.8 nm gauge resolution and ⅒ λ from measurement performance for optics. The degree of high precision in the molded lenses is measured by three-dimensional (3D) contact measurements. Data obtained from the profilometer measurement showed that replication under the optimal molding conditions for each composition (as determined by designed experiment, where the lens molded from the material of CEx. 1 was molded at a mold temperature of 135° C., a cylinder temperature of 330° C., and a holding pressure and time sequence of 80 MPa/0.8 sec, 50 MPa/2.0 sec, and 40 MPa/2.0 sec, and the lens molded from the material of Ex. 1 was molded at a mold temperature of 120° C., a cylinder temperature of 310° C., and a holding pressure and time sequence of 80 MPa/0.8 sec, 50 MPa/2.0 sec, and 40 MPa/2.0 sec.) resulted in acceptable replicability for lenses prepared from both materials (OQ-PC of CEx. 1 and PAE-PC-1 of Ex. 1). The lens form (replication, and deviation from the required dimensions) was within the specifications, meaning that the precision dimension for each lens was within the 400 nm reference line for overall tolerance. FIG. 3A shows the surface profile of a lens fabricated using the OQ-PC of CEx. 1; FIG. 3B shows the surface profile of a lens fabricated using the PAE-PC-1 of Ex. 1. It can be seen in FIG. 3A that lenses prepared from each composition shows surface variation that is within a 400 nm (0.4 micrometer) overall tolerance.

Measurement of birefringence. Birefringence was measured for lenses molded from the materials of CEx. 1 and Ex. 1. The lens molded from the material of CEx. 1 was molded at a mold temperature of 135° C., a cylinder temperature of 330° C., and a holding pressure and time sequence of 80 MPa/0.8 sec, 50 MPa/2.0 sec, and 40 MPa/2.0 sec. The lens molded from the material of Ex. 1 was molded at a mold temperature of 120° C., a cylinder temperature of 310° C., and a holding pressure and time sequence of 80 MPa/0.8 sec, 50 MPa/2.0 sec, and 40 MPa/2.0 sec. Birefringence for exemplary lenses (i.e., within the tolerances set by the 400 nm reference line) was measured using an Oji Instruments Kobra-CCD automatic birefringence analyzer operating at a wavelength of 590 nm. FIG. 4 shows a comparison of the results from birefringence measurement. In FIG. 4A, it can be seen in the region under the dashed line that there is a greater contour corresponding to a higher degree of birefringence, when compared to the area under the dashed line in FIG. 4B. The average calculated birefringence for the OQ-PC lens (CEx. 1) is 81 nm, which is 10 nm greater than the average retardation for the PAE-PC-1 (Ex. 1) lens of 71 nm seen in FIG. 4B. Birefringence of lenses prepared from PAE-PC-1 thereby shows dramatic improvement relative to OQ-PC.

Heat and Humidity Testing. Samples of the molded lenses prepared from Ex. 1 and CEx. 1 were exposed to conditions of 85% relative humidity at 85° C. for about 1,000 hours. Optical properties of the lenses, including percent light transmittance and percent haze were then measured. It was found that after 1,000 hours, less than a 1% reduction in percent transmittance was observed for all visible wavelengths, and the observed percent haze values for the samples so tested remained less than 1%, for the Ex. 1.

Comparative Examples 2-4, and Examples 2-18. Poly(aliphatic ester)-polycarbonate copolymers with suitable melt flow and optical properties were prepared from unsuitable or less-than-optimal higher molecular weight, high viscosity materials, (e.g., where the haze is too high, or where the MVR is at the low margin), by subjecting such materials to extrusion conditions in the presence of a redistribution catalyst. PAE-PC-2, which has a higher molecular weight (Mw=19,500 g/mol) and lower MVR (13.8 cc/10 min. than PAE-PC-1 under identical measurement conditions, was modified by redistribution under identical extrusion and molding conditions, except that the mold temperature for the optical samples of Trial 1 (CEx. 2 and 3 and Exs. 2-10) was held at 90° C., while the mold temperature for optical samples of Trial 2 (CEx. 4, and Exs. 11-18) was held at 70° C. PAE-PC-2 was compounded with additives and a redistribution catalyst (TBPH, aqueous solution) in the proportions described for Trial 1 (Table 4) and Trial 2 (Table 5), and extruded to form the corresponding higher flow poly(aliphatic ester)-polycarbonate copolymer. The properties of the resulting redistributed PAE-PC under these extrusion conditions are shown in Tables 4 and 5, below.

TABLE 4

|  | CEx 2 | CEx 3 | Ex. 2 | Ex. 3 | Ex. 4 | Ex. 5 |
| --- | --- | --- | --- | --- | --- | --- |
| PAE-PC-2 (wt %) | 99.94 | 99.94 | 94.94 | 92.44 | 89.94 | 87.44 |
| GMS (wt %) | 0.04 | 0.04 | 0.04 | 0.04 | 0.04 | 0.04 |
| Stabilizer (wt %) | 0.02 | 0.02 | 0.02 | 0.02 | 0.02 | 0.02 |
| 40% TBPH (1:2000 w/w dilution; wt %) | 0 | 0 | 5 | 7.5 | 10 | 12.5 |
| ppm TBPH (ppm by weight) | 0 | 0 | 10 | 15 | 20 | 25 |
| Optical Data - 3.2 mm molded plaques |  |  |  |  |  |  |
| L | 95.733 | 95.773 | 95.785 | 95.779 | 95.782 | 95.764 |
| a | −0.142 | −0.158 | −0.130 | −0.129 | −0.136 | −0.142 |
| b | 1.022 | 1.048 | 0.923 | 0.939 | 0.970 | 0.994 |
| T 420 nm (%) | 86.972 | 86.957 | 87.340 | 87.260 | 87.211 | 87.114 |
| Transmission (%) | 90.9 | 91.1 | 91.1 | 91.1 | 91.1 | 91.0 |
| Haze (%) | 1.57 | 0.65 | 1.15 | 0.74 | 0.82 | 0.85 |
| Yellowness Index (YI) | 2.042 | 2.072 | 1.869 | 1.898 | 1.95 | 1.99 |
| Optical Data - 2.5 mm molded plaques |  |  |  |  |  |  |
| L | 95.793 | 95.845 | 95.856 | 95.825 | 95.848 | 95.831 |
| a | −0.117 | −0.132 | −0.108 | −0.116 | −0.113 | −0.121 |
| b | 0.875 | 0.879 | 0.787 | 0.832 | 0.817 | 0.846 |
| T 420 nm (%) | 87.493 | 87.549 | 87.847 | 87.628 | 87.749 | 87.635 |
| Transmission (%) | 91.1 | 91.2 | 91.2 | 91.2 | 91.2 | 91.2 |
| Haze (%) | 1.05 | 0.64 | 0.67 | 0.66 | 0.55 | 0.60 |
| Yellowness Index (YI) | 1.792 | 1.783 | 1.634 | 1.711 | 1.686 | 1.733 |
| Vicat Softening Temperature (° C.) | 125.8 | 127.0 | 125.3 | 125.2 | 126.4 | 125.1 |
| MVR 250° C./1.2 kg/4 min dwell (cc/10 min)$^a$ | 13.76 |  | 14.35 | 14.92 | 15.56 | 15.51 |
| Mw | 19513 | 19766 | 19610 | 19480 | 19373 | 19566 |
| Mn | 7413 | 7419 | 7508 | 7450 | 7568 | 7588 |
| PD | 2.63 | 2.66 | 2.61 | 2.61 | 2.56 | 2.58 |

|  | Ex. 6 | Ex. 7 | Ex. 8 | Ex. 9 | Ex. 10 |
| --- | --- | --- | --- | --- | --- |
| PAE-PC-2 (wt %) | 84.94 | 82.44 | 79.94 | 69.94 | 49.94 |
| GMS (wt %) | 0.04 | 0.04 | 0.04 | 0.04 | 0.04 |
| Stabilizer (wt %) | 0.02 | 0.02 | 0.02 | 0.02 | 0.02 |
| 40% TBPH (1:2000 w/w dilution; wt %) | 15 | 17.5 | 20 | 30 | 50 |
| ppm TBPH (ppm by weight) | 30 | 35 | 40 | 60 | 100 |
| Optical Data - 3.2 mm molded plaques |  |  |  |  |  |
| L | 95.771 | 89.498 | 95.754 | 95.755 | 94.528 |
| a | −0.139 | −0.034 | −0.142 | −0.150 | −0.128 |
| b | 1.005 | 0.667 | 1.024 | 1.075 | 1.160 |
| T 420 nm (%) | 87.099 | 73.957 | 87.001 | 86.876 | 83.871 |
| Transmission (%) | 91.1 | 91.1 | 91.0 | 91.0 | 88.7 |
| Haze (%) | 0.68 | 0.79 | 0.96 | 0.76 | 1.58 |
| Yellowness Index (YI) | 2.013 | 1.554 | 2.045 | 2.133 | 2.335 |
| Optical Data - 2.5 mm molded plaques |  |  |  |  |  |
| L | 95.823 | 95.834 | 95.827 | 95.820 | 95.764 |
| a | −0.127 | −0.121 | −0.125 | −0.129 | −0.135 |
| b | 0.871 | 0.876 | 0.875 | 0.928 | 0.990 |
| T 420 nm (%) | 87.562 | 87.543 | 87.550 | 87.399 | 87.114 |
| Transmission (%) | 91.2 | 91.2 | 91.2 | 91.1 | 91.1 |
| Haze (%) | 0.65 | 0.51 | 0.66 | 0.48 | 0.59 |
| Yellowness Index (YI) | 1.775 | 1.788 | 1.784 | 1.878 | 1.99 |
| Vicat Softening Temperature (° C.) | 126.1 | 126.2 | 125.6 | 125.7 | 125.4 |
| MVR 250° C./1.2 kg/4 min dwell (cc/10 min)$^a$ | 14.91 | 14.94 | 14.74 | 15.54 | 20.09 |
| Mw | 19653 | 19553 | 19720 | 19923 | 18660 |
| Mn | 7800 | 7818 | 7944 | 8378 | 8332 |
| PD | 2.52 | 2.50 | 2.48 | 2.38 | 2.24 |

$^a$MVR measured according to ISO 1133.

TABLE 5

| Name | CEx 4 | Ex. 11 | Ex. 12 | Ex. 13 | Ex. 14 | Ex. 15 | Ex. 16 | Ex. 17 | Ex. 18 [a] |
|---|---|---|---|---|---|---|---|---|---|
| PAE-PC-2 (wt %) | 99.94 | 93.69 | 87.44 | 79.94 | 74.94 | 69.94 | 59.94 | 49.94 | 74.94 |
| GMS (wt %) | 0.04 | 0.04 | 0.04 | 0.04 | 0.04 | 0.04 | 0.04 | 0.04 | 0.04 |
| Stabilizer (wt %) | 0.02 | 0.02 | 0.02 | 0.02 | 0.02 | 0.02 | 0.02 | 0.02 | 0.02 |
| 40% TBPH (1:1000 w/w dilution; wt %) | 0 | 6.25 | 12.5 | 20 | 25 | 30 | 40 | 50 | 25 |
| ppm TBPH (ppm by weight) | 0 | 25 | 50 | 80 | 100 | 120 | 160 | 200 | 100 |
| Torque (%) | 46 | 44 | 43 | 41 | 40 | 39 | 36 | 33 | 40 |
| Optical Data - 3.2 mm molded plaques | | | | | | | | | |
| L | 95.794 | 95.793 | 95.745 | 95.733 | 95.489 | 95.725 | 95.658 | | 95.763 |
| a | −0.141 | −0.129 | −0.144 | −0.148 | −0.149 | −0.152 | −0.156 | | −0.158 |
| b | 1.005 | 0.979 | 1.107 | 1.149 | 1.202 | 1.218 | 1.307 | | 1.155 |
| T 420 nm (%) | 87.144 | 87.239 | 86.822 | 86.659 | 85.975 | 86.505 | 86.149 | | 86.724 |
| Transmission (%) | 90.9 | 90.9 | 90.8 | 90.8 | 90.2 | 90.7 | 90.5 | | 90.8 |
| Haze (%) | 0.85 | 0.51 | 0.62 | 0.65 | 0.75 | 0.45 | 0.62 | | 0.53 |
| Yellowness Index (YI) | 2.005 | 1.968 | 2.194 | 2.268 | 2.37 | 2.394 | 2.558 | | 2.27 |
| Optical Data - 2.5 mm molded plaques | | | | | | | | | |
| L | 95.824 | 95.857 | 95.839 | 95.81 | 95.791 | 95.797 | 95.793 | | 95.832 |
| a | −0.108 | −0.104 | −0.114 | −0.121 | −0.109 | −0.119 | −0.123 | | −0.128 |
| b | 0.862 | 0.863 | 0.906 | 0.988 | 0.973 | 1.047 | 1.025 | | 0.977 |
| T 420 nm (%) | 87.591 | 87.706 | 87.56 | 87.292 | 87.281 | 87.125 | 87.128 | | 87.332 |
| Transmission (%) | 90.9 | 91 | 91 | 90.9 | 90.8 | 90.9 | 90.9 | | 91 |
| Haze (%) | 0.6 | 0.52 | 0.44 | 0.58 | 0.51 | 0.47 | 0.5 | | 0.46 |
| Yellowness Index (YI) | 1.772 | 1.777 | 1.848 | 1.994 | 1.977 | 2.107 | 2.061 | | 1.967 |
| Vicat Softening Temperature (° C.) | 125.1 | 125.9 | 125.6 | 124.9 | 125.0 | 123.2 | 123.1 | | 124.5 |
| MVR 250° C./1.2 kg/4 min dwell (cc/10 min) [b] | 13.52 | 14.5 | 15.24 | 16.72 | 18.67 | 22.13 | 30.66 | 40.16 | 18.63 |
| MVR 250° C./1.2 kg/12 min dwell (cc/10 min) [b] | 13.62 | | | | | 22.09 | | | |
| Delta MVR 250° C. (%) | 0.7 | | | | | −0.2 | | | |
| MVR 250° C./1.2 kg/4 min dwell (cc/10 min) [b] | | | | | | | 104.5 | 143.1 | 87.1 |
| Mw | 19801 | 19593 | 19864 | 19335 | 18989 | 18315 | 17146 | 16348 | 19191 |
| Mn | 7543 | 7625 | 8229 | 8563 | 8511 | 8255 | 7765 | 7371 | 8472 |
| PD | 2.63 | 2.57 | 2.41 | 2.26 | 2.23 | 2.22 | 2.21 | 2.22 | 2.27 |

[a] Repeat of Ex. 18;
[b] MVR measured according to ISO 1133.

Figure 5:
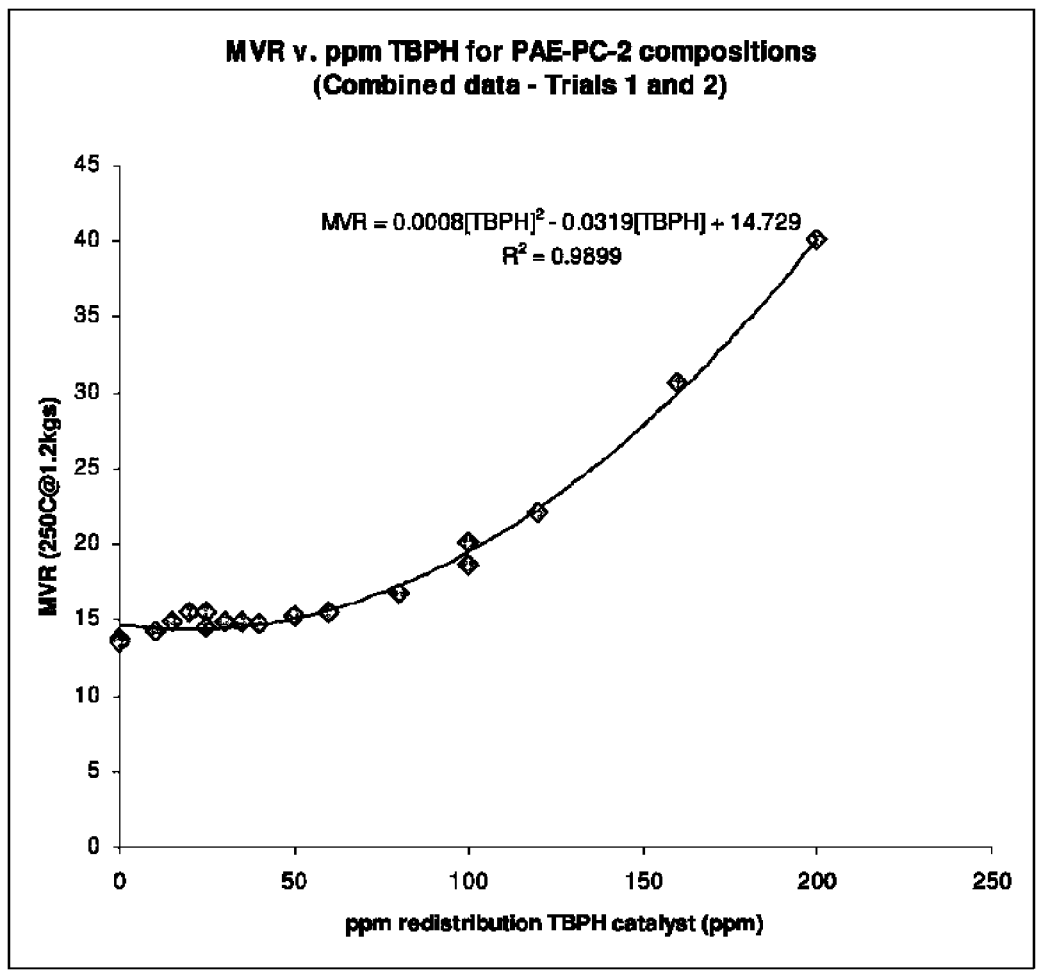
FIG. 5 shows a plot of melt-volume rate according to ISO 1133 versus loading of redistribution catalyst (ppm) for different poly(aliphatic ester)-polycarbonate compositions.

As seen in the data for each of Trials 1 and 2 (Tables 4 and 5), MVR values increased with higher loadings of TBPH. FIG. 5 shows a plot of MVR versus ppm TBPH for the combined MVR data for Trials 1 and 2, in which a nonlinear (quadratic) but consistent overall increase in MVR is seen with increasing TBPH loading for the samples. The MVR results fell within the desired range of 13 to 25 cc/10 min at 250° C./1.2 kg for all but the highest loadings of TBPH (Ex. 16 at 160 ppm TBPH, and Ex. 17 at 200 ppm TBPH). It is believed that deviations observed in the MVR data as plotted in FIG. 5, particularly at TBPH loadings less than 50 ppm, may be attributable to variations in the MVR measurement method and variations in the redistribution process. It is understood that compounding conditions, such as use of a twin screw vs. single screw extruder, variations in extruder barrel temperature profile, and throughput (based on screw speed) can affect the redistribution efficiency and hence properties such as molecular weight and MVR of the redistributed product.

MVR values for redistribution with amounts of TBPH of greater than 120 ppm (Ex. 16 and Ex. 17) were greater than the desired maximum value of 25 cc/10 min. at 250° C./1.2 kg. Increasing the dwell time, from 4 minutes to 12 minutes, for the redistributed PAE-PC-2 resulted in a slight decrease in MVR of −0.2% for Ex. 15, indicating a slight-to-negligible reduction in viscosity with prolonged dwell, compared to CEx. 4 (without TBPH added), which showed a slight increase in viscosity, of about 0.7%, with added dwell time. The minor change in viscosity of the redistributed PAE-PC-2 (Ex. 15) thus shows a viscosity-stable product at a temperature of 250° C. for the additional 8 minutes of dwell time (between 4 minutes and 12 minutes) indicating that the TBPH catalyst decomposed during the compounding process.

Figure 6:
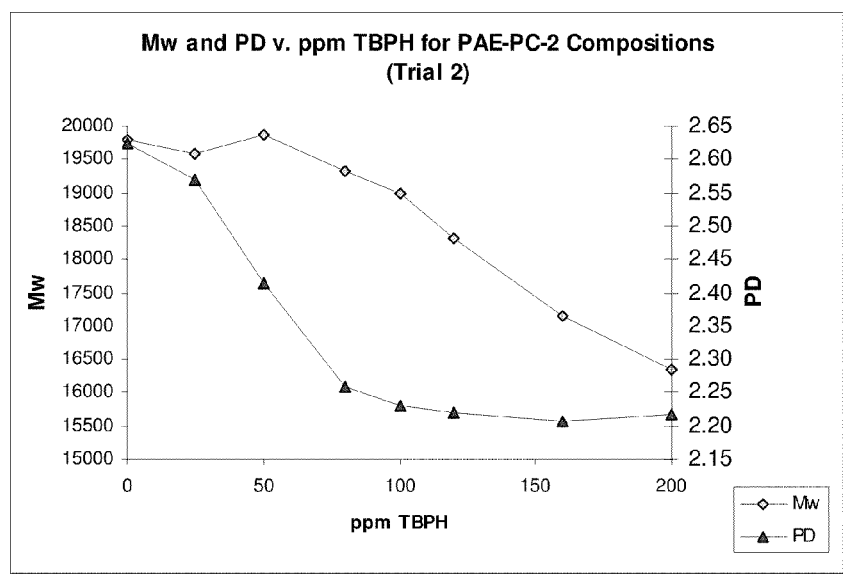
FIG. 6 shows a plot of weight-average molecular weight and polydispersity versus loading of redistribution catalyst (ppm) for different poly(aliphatic ester)-polycarbonate compositions.

The remaining data shown in Tables 4 and 5, including MVR, Vicat softening, optical data at 3.2 and 2.5 mm plaque thicknesses (i.e., % T, haze, and YI), and molecular weight, were all within acceptable limits. FIG. 6 shows a plot of weight average molecular weight (Mw) and polydispersity (PD) versus ppm TBPH catalyst. In this plot, it can be seen that the decrease in Mw is approximately inversely proportional and linear with increasing TBPH catalyst loading, and that the redistributed product approaches a constant polydispersity of between 2.20 and 2.25 at a catalyst loading of 75 ppm or greater. During molding of samples at the mold temperature of 70° C. (Trial 2, Table 5), the molded samples were observed to break at the sprue, for materials prepared with 100 to 120 ppm of TBPH or higher (i.e., beginning about Ex. 14).

Preparation of poly(aliphatic ester)-polycarbonate co- and terpolymer compositions and analysis by Designed Experiment. Preparation of a series of poly(aliphatic ester)-polycarbonate co- and terpolymers with $C_{36}$ soft block was carried out to examine properties including glass transition temperature, refractive index, and intrinsic birefringence for these polymer compositions, based on the composition and proportion of each repeating unit. Each of these poly(aliphatic ester)-polycarbonate co- and terpolymers was compared with an experimental design for the polymer compositions. The experimental design was prepared to show probable compositional boundary conditions expected to provide polymer compositions have glass transition temperatures, refractive index, and an intrinsic birefringence useful for preparing camera lenses.

The soft block in each poly(aliphatic ester)-polycarbonate co- or terpolymer was derived a $C_{36}$ aliphatic dicarboxylic acid (available from Uniqema); carbonate units were derived from 2-phenyl-3,3-bis(4-hydroxyphenyl)phthalimidine (PP-PBP), and additional carbonate groups (present in all examples except Ex. 20) were derived from either bisphenol A (BPA) or 1,1-bis(3-methyl-4-hydroxyphenyl)cyclohexane (DMBPC). The proportions by weight of soft block, PPPBP, and BPA or DMBPC are provided in Table 6, below. Note that except where otherwise specified, the additional carbonate groups were derived from BPA. Exemplary interfacial polymerization and melt polymerization methods used to prepare the polymers are described as follows.

Exemplary procedure for interfacial polymerization: co-feeding of bis(4-hydroxyphenyl)-N-phenyl-phthalimidine (PPPBP) and $C_{36}$ diacid during phosgenation (Example 21). Methylene chloride (20 L), water (6 L), bisphenol A (BPA, 2116 g), p-cumylphenol (PCP, 150g), triethylamine (85 ml) and sodium gluconate (10 g) was charged to a 75 L reactor equipped with mechanical agitation, condenser, and caustic scrubber vent system. Phosgene (625 g) was added at a rate of 60 g/min to the reactor while 50 wt % caustic was added at a rate to maintain a pH of about 5. At the same time the phosgene was being added, solutions of PPPBP and $C_{36}$ diacid were co-fed to the reactor. Specifically, a solution of PPPBP (1750 g) dissolved in water (6660 g) and 50 wt % caustic (940 g) was fed at a rate of 900 g/min, while at the same time a solution of $C_{36}$ diacid (PRIPOL® 1009 diacid, 625 g) in methylene chloride (2 L) was fed to the reactor at a rate of 250 g/min. Upon completion of addition of the phosgene, PPPBP solution, and $C_{36}$ diacid solutions, additional caustic was added to the reactor to achieve a pH of about 10, at which time additional phosgene (1600 g) was added at a rate of 60 g/min while caustic was added at a rate to maintain the pH at about 10.5. The reactor was then sampled and worked up for GPC analysis to determine completion of the reaction based on molecular weight, where sample workup entailed washing with a dilute acid (0.1 N HCl) followed by repeated washings with deionized water until residual chloride levels were less than 5 ppm. GPC results showed an Mw for the acid-washed sample of 21,830 g/mol, while the Mw of the amine-treated sample was 20,785, for a reduction in Mw for the amine treated sample of 4.8% relative to the acid washed sample.

To compensate for any potential degradation that may have occurred during the delay for GPC analysis, additional phosgene (200 g) was added at a feed rate of 80 g/min with sufficient caustic to achieve a pH of about 9. The reaction mixture was then purged with nitrogen to remove residual phosgene, and transferred to another tank and centrifuged to separate and remove the aqueous layer. The organic layer containing the polymer was then washed on a centrifuge train with 1N HCl (aq.) followed by successive deionized water washes until residual chloride levels were <5 ppm (by weight), and isolation of the polymer by steam precipitation followed by drying under hot nitrogen. The final dried polymer had an Mw of 20,673 and polydispersity of 2.33 by GPC (relative to polycarbonate standards), <1 ppm triethylamine, <1 ppm residual chloride, and 0.07 ppm residual Fe.

The polymers were prepared in this way according to the proportions and substitutions (e.g., where BPA in Ex. 20 is replaced by bis(4-hydroxy-3-methylpheny)-1,1-cyclohexane (DMBPC) in Ex.21) as described in Table 6, below.

General Procedure for the melt polymerization. To evaluate properties of copolymers based on monomers available in limited quantities, melt trans-esterification reactions where carried out batch mode in a 25 gram-scale batch reactor. Residual sodium was removed from the glass reactor by soaking the reactor in 1M HCl for at least 24 hours followed by repeated rinsing (5 times or more) with 18.2 milliohm (mΩ) deionized water. The reactor was heated using a heating mantle with a proportional-integral-derivative (PID) temperature controller. The pressure in the reactor was controlled by a nitrogen bleed into the vacuum pump downstream of the distillate collection flasks and was measured with a pressure gauge. Catalyst solutions were prepared by diluting the stock catalysts (tetramethyl ammonium hydroxide (TMAH; Sachem, 25% by weight in water) and NaOH (Acros, 0.5 mol/L)) to the proper concentrations with 18.2 mΩ water. All reactions where carried out using catalyst included in an amount of 100 microliters, at a catalyst concentration in the reaction of $2.5 \times 10^{-5}$ mol TMAH per mole of diol (e.g., PPPBP, BPA, and DMBPC), or where NaOH is used, at concentration in the reaction of $1.0 \times 10^{-6}$ mol of NaOH per mole of diol. The amount of catalyst added is maintained at 100 microliters for the 25 g reaction scale, and where higher levels were needed, more concentrated solutions were prepared.

In the reaction, the glass reactor tube was charged with the solid diol(s) and diacid where the sum of diol and diacid is 0.05879 to 0.05995 moles. Solid bis(methylsalicyl) carbonate (0.0605 mol) was then added (where the amount is adjusted to depend on the targeted molar ratio of 1.01 to 1.03 based on diol). The reactor was then assembled, sealed and the vessel was purged with nitrogen three times. The catalyst was added to the monomers. The reactor was brought to near atmospheric pressure and reaction time was started at the same moment as the heaters were set to the first set point.

The reactants (diacid, diol, BMSC, and catalyst) were melted together at 180° C., 1,000 mbar pressure and the overhead condenser was heated to 100° C. After 6 minutes, stiffing at 40 rpm was initiated. Once the reactants (monomers) were molten, after about 15 minutes, the pressure in the reactor was reduced to 500 mbar and stiffing was continued. After 45 minutes, the temperature of the reactor was ramped up to 270° C. over 5 minutes. Then, at 50 minutes, the reactor temperature was set to 300° C. and, at the same time, the pressure was slowly reduced to full vacuum (about 0.5 to about 1 mbar). Full vacuum is typically achieved after about 4 minutes. When the desired viscosity was reached (generally after about 60 min. of reaction time), the polymerization was stopped, and the reactor is brought back to atmospheric pressure under a gentle nitrogen flow. When atmospheric pressure is reached the agitators were stopped and the product drained from the reactor tubes by opening the reactors at the bottom, while pushing out the product with a slight nitrogen overpressure. The resulting product was analyzed for Tg and molecular weight (GPC, polycarbonate standards) and was then used in subsequent molding processes.

Measurement of Refractive Index and Intrinsic Birefringence (BR*). Refractive index and intrinsic birefringence for polymer compositions (Examples 19-28 and Comparative Example 5) were carried out by the following method, based upon the methods disclosed in Toney, M. F. et al., "Near surface alignment of polymers in rubbed films," *Nature*, 1995, vol. 374, p. 709; Ge, J. J. et al., "Surface studies of polyimide thin films via surface-enhanced Raman scattering and second harmonic generation," *Macromol. Rapid Commun.*, 1998, vol. 19, p. 619; and Agra, D. M. G. et al., "Relaxation dynamics of rubbed polystyrene thin films," *Europhys. Lett.*, 2000, vol. 51, p. 655, each of which is incorporated herein by reference.

A solution of the polymer composition to be tested was spin coated on a silicon wafer to form a thin film having a thickness of 250 to 500 nm (with a typical thickness of 400 nm). The film was baked on a hot plate to remove residual solvent. The refractive index of the cast film was then measured by multi-angle ellipsometry, in which the thin film is illuminated with a beam of polarized light over the UV-VIS spectrum (about 200 nm to about 750 nm). The ellipsometer measures phase and intensity of the reflected beam at several different angles, the measured data is then fitted with a series of equations and the refractive index is derived as a function of wavelength. After measurement of the initial RI, the film was rubbed longitudinally along a single direction using velvet paper for more than 25 rubs, typically 40 to 45 rubs (where one rub is equal to one traverse across the wafer using the velvet paper). The film so rubbed is said to reach a point of saturation, i.e., a point beyond which further rubbing does not further increase the chain alignment, independent of the operator. By rubbing the surface of the thin film with velvet paper, it was possible to align the polymer chains along the rubbing direction. Refractive index was again measured on the rubbed thin film by ellipsometry. It was observed that the RI in the rubbed direction was greater than the RI measured perpendicular to the direction of rubbing, and increases until the rubbed thin film is saturated. Intrinsic birefringence is then calculated by subtracting the RI in the direction of rubbing from the RI of the thin film perpendicular to the direction of rubbing, as shown in the following equation:

$$RI(\text{direction of rubbing}) - RI(\text{perpendicular to direction of rubbing}) = BR^*(\text{intrinsic})$$

where it will be appreciated that the intrinsic birefringence is a unitless number. The value at saturation correlated well with reported melt stress optical coefficient (Cm) values for a variety of different polymers, and thus the saturated value was identified as representing the "intrinsic BR", or BR* as reported in Table 6, of the fully aligned polymer chains. This technique represents rapid and convenient method of characterizing the polymers by RI and BR*, and is particularly useful for samples available in small quantities (25-50 g) for screening.

Tg and RI to the polymer), were included in each polymer composition except Example 19.

Figure 7:
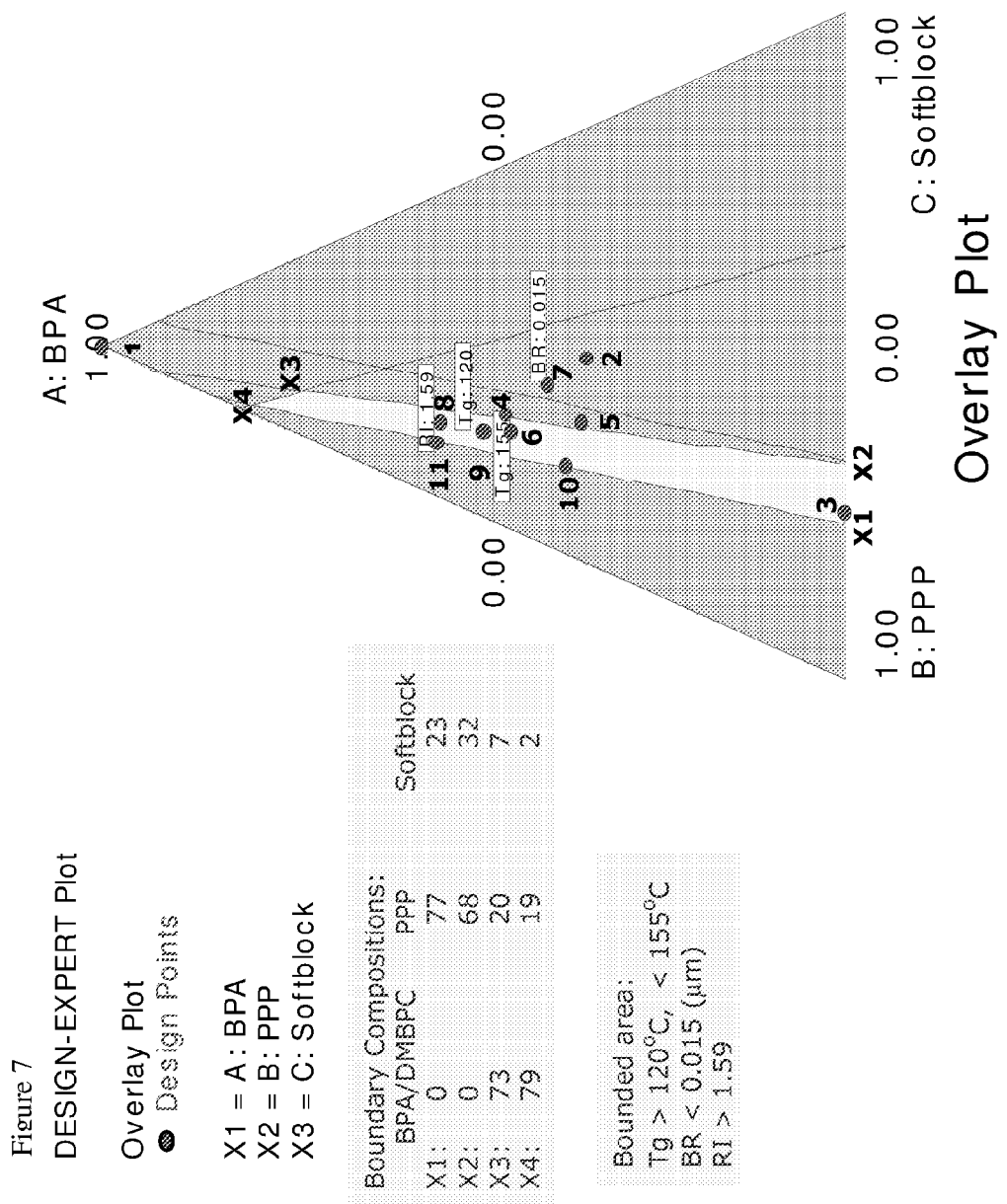
FIG. 7 shows a ternary plot of composition for soft block, 2-phenyl-3,3-bis(4-hydroxyphenyl)phthalimidine, and bisphenol A, for a designed experiment.

FIG. 7 shows the ternary compositional overlay plot generated using DESIGN-EXPERT® software (available from STAT-EASE® Software corporation). The overlay plot describes the overall compositional space for polymer compositions of from 0 to 100 wt % BPA (apex labeled "A:"), 0 to 100 wt % PPPBP (apex labeled "B:"), and 0 to 100 wt % soft block (apex labeled "C:"). Each apex thus represents a homopolymer of 100% of the corresponding monomer, and each leg of the triangle describes a copolymer of varying composition, such as e.g., the base line represented by B: to C:, which represents copolymer compositions varying from 100 wt % PPPBP to 100 wt % soft block (and 0 wt % BPA).

The lines contained within the overall triangular plot correspond to boundary conditions for properties correlating with polymer composition. For example, the line labeled "Tg: 155" represents the boundary condition for the upper limit of glass transition temperature of 155° C., where compositions in the design space to the left of this line (i.e., between the "Tg: 155" line and the A:-B: boundary) have glass transition temperatures greater than 155° C.; and similarly the line labeled "Tg: 120" represents the boundary condition for the lower limit of glass transition temperature of 120° C., where compositions in the design space to the right of this line (i.e., between the "Tg: 120" line and the A:-C: boundary) have glass transition temperatures less than 120° C. The line labeled "BR: 0.015" represents the upper limit of birefringence (expressed in µm, which corresponds to an intrinsic birefringence of 0.015) where polymer compositions to the right of this line (between "BR: 0.015" and the A:-C: boundary) have an intrinsic birefringence greater than 0.015. The line labeled "RI: 1.59" represents the lower limit of refractive index, where polymer compositions to the right of this line (between "RI: 1.59" and the A:-C: boundary) have a refractive index less than 1.590.

TABLE 6

| | Design Points (FIG. 7) | BPA or DMBPC in wt % (mol %) | PPPBP in wt % (mol %) | soft block[a] in wt % (mol %) | Mw (g/mol) | Tg (° C.) | RI | BR* |
|---|---|---|---|---|---|---|---|---|
| CEx. 5 | 1 | 100 (100) | 0 (0) | 0 (0) | 22,814 | 145 | 1.586 | 0.025 |
| CEx. 6 | 2 | 35 (50) | 35 (30) | 31 (20) | 22,602 | 91 | 1.575 | 0.011 |
| Ex. 19 | 3 | 0 (0) | 75 (80) | 25 (20) | 18,151 | 152 | 1.599 | 0.003 |
| CEx. 7 | 4 | 46 (60) | 38 (30) | 17 (10) | 20,271 | 131 | 1.587 | 0.009 |
| CEx. 8 | 5 | 92.7 (96.5) | 0 (0) | 7.3 (3.5) | — | 123 | 1.579 | — |
| CEx. 9 | 6 | 94.7 (97.5) | 0 (0) | 5.3 (2.5) | — | 128 | 1.580 | — |
| CEx. 10 | 7 | 40 (55) | 36 (30) | 24 (15) | 20,764 | 108 | 1.581 | 0.009 |
| Ex. 20[b] | 8 | 54 (62.5) | 34 (30) | 11 (7.5) | 21,542 | 137 | 1.596 | 0.011 |
| Ex. 21 | 9 | 49 (62.5) | 38 (30) | 13 (7.5) | 12,502 | 137 | 1.593 | 0.013 |

[a]Soft block is $C_{36}$ aliphatic diacid.
[b]Dihydroxyaromatic compound is DMBPC.

The polymer compositions in Table 6 were analyzed by comparison with the ternary compositional plot generated by designed experiment shown in FIG. 7, to determine the overall effect of composition between differing amounts of soft blocks varying in chain length and overall carbon content. The soft blocks were derived from $C_{36}$ aliphatic diacid and were copolymerized with a high rotational barrier dihydroxyaromatic monomer (PPPBP), which provides both increased refractive index and Tg with increasing amounts. An optional third dihydroxyaromatic monomer (BPA or DMBPC, where the latter has a higher rotational barrier and refractive index than the former and hence imparts a higher Compositional data points X1 (23 wt % soft block and 77 wt % PPPBP), X2 (32 wt % soft block and 68 wt % PPPBP), X3 (7 wt % soft block, 20 wt % PPPBP, and 73 wt % BPA), and X4 (2 wt % soft block, 19 wt % PPPBP, and 79 wt % BPA), mark the corner compositions which form the inner boundary space defined by the four lines (Tg: 155, Tg: 120, RI: 1.59, and BR: 0.015 in FIG. 7). The shaded area bounded by these four lines is the calculated optimum design space for polymer compositions, where any composition falling within this design space is believed to meet the performance requirements for Tg, RI, and BR for a camera lens.

Also in FIG. 7, design points 1, 2, and 4 to 7, (corresponding to CExs. 5 to 10, respectively) and 3, 8, and 9 (corresponding to Exs. 19-21, respectively) were overlaid onto this plot to identify compositions with properties useful in applications requiring high refractive index (>1.590) and low intrinsic birefringence (<0.015 nm), and Tg (from greater than 120° C. to 155° C.). The distribution of data points within the shaded region of FIG. 7 thus were believed to correspond to the examples which met all of the above criteria for a camera lens. According to the experimental design plot therefore, compositions for data points 3, 8, and 9, (which correspond to Exs. 19, 20, and 21) and data points 4 and 7 and (CExs. 7 and 10) should each meet the criteria for a camera lens. The data are analyzed below.

In the examples described in Table 6, soft block/PPPBP/BPA terpolymers (Exs. 19-21) exhibited RI values of 1.593 (Ex. 21) to 1.599 (Ex. 19), and comparative soft-block containing copolymers have an RI of from 1.575 (CEx. 6) to 1.587 (CEx. 7) which brackets the RI value for the comparative bisphenol A homopolymer (CEx. 5). Similarly, the exemplary terpolymers exhibited an intrinsic birefringence of from 0.003 (Ex. 19) to 0.013 (Ex. 21); and the comparative examples range from 0.009 (CExs. 7 and 10) to 0.011 (CEx. 6), all of which were desirably about half or less the intrinsic birefringence of BPA homopolymer CEx. 5 (0.025), and within the desired range suitable for a camera lens of less than or equal to 0.015.

The soft block/PPPBP copolymer (Ex. 19) and the soft block/PPPBP/DMBPC terpolymer (Ex. 20) each exhibited higher refractive index values relative to the BPA containing terpolymers, generally from 1.593 (Ex. 21) and lower in the comparative examples. Further, the RI of the comparative soft-block-BPA copolymers (CExs. 8 and 9, having RI values of 1.579 and 1.580 respectively), even with their low soft block content (3.5 wt % and 2.5 wt % respectively), were both lower than that of the soft block-PPPBP copolymer (Ex. 19; RO of 1.599), which clearly shows the advantageous RI performance conveyed by the PPPBP monomer. Also, intrinsic birefringence for soft block-PPPBP copolymer Ex. 19 (0.003) was significantly lower than either the comparative example (CEx. 5, at 0.025) or the best DMBPC-containing terpolymer (Ex. 20 at 0.011).

As seen in generally in Table 6, soft blocks derived from a higher molecular weight soft block (e.g., $C_{36}$ diacid) present at about 20 mol %, in combination with conformationally rigid monomer PPPBP (see e.g., Ex. 19), provided the highest refractive index and lowest intrinsic birefringence obtained for these compositions. For the terpolymers however, low amounts (about 7.5 mol %) of high carbon content soft block (e.g., $C_{36}$ diacid, Exs. 20 and 21) while providing adequate intrinsic birefringence, did not provide as good intrinsic birefringence as found with increased amounts of lower carbon content soft block (e.g., CEx. 7); however, the increased amount of soft block in this comparative example, which was offset by higher BPA loading (and not higher PPPBP) provided an RI that was insufficient (1.587) to meet the RI target of greater than or equal to 1.590. As a co-monomer in a terpolymer, for equivalent compositions by weight, DMBPC included as a third monomer after $C_{36}$ soft block and PPPBP, provided better overall performance in both RI and intrinsic birefringence than BPA (Ex. 20 with DMBPC, compared with Ex. 21 with BPA).

From the data in Table 6 overall, it can be seen that the inclusion of relatively higher amounts of carbonate units derived from 2-hydrocarbyl-3,3-bis(4-hydroxyaryl)phthalimidine monomers (e.g., PPPBP), relative to e.g., carbonate units derived from bisphenol A, produced a desirably high RI and reduced BR. Acceptable intrinsic birefringence and increased RI for applications such as lenses thus require at least about 30 mol % PPPBP (see e.g., Ex. 26, with 30 mol % of PPPBP, an intrinsic birefringence of 0.013, and an RI of 1.593).

It should also be noted that increased DMBPC or PPPBP content increased the glass transition temperature and reduces processing latitude (e.g., Ex. 19, with 75 wt % of PPPBP has a Tg of 152° C., whereas CEx. 10, with 40 wt %% BPA, has a Tg of 108° C.). Higher amounts of soft block may significantly reduce the Tg, and if not offset by increased amounts of PPPBP or DMBPC, may render the resulting melt properties to be unsuitable for processing (e.g., extrusion and molding). To provide acceptable processing conditions (e.g., extrusion and molding conditions), at least 7.5 mol % of an aliphatic comonomer is desirable, depending on the length of the aliphatic part of this monomer. For example, 7.5 mol % of $C_{36}$ diacid and 30.0 mol % sebacic acid can give the same Tg; however, increasing the ester content (as measured by higher aliphatic dicarboxylic acid content of sebacic acid to achieve the same Tg) in polyester-polycarbonates resulted in an increased probability of undesirable side reactions. Maintaining a balance of these properties and considerations is therefore essential to providing a useful composition. Based on the overall criteria, compositions of Exs. 19, 20, and 21 would generally be acceptable for camera lenses. Of these, Exs. 20 and 21 have the lowest soft block content ($C_{36}$ diacid). A comparison with the experimental design plot which indicates that data points 3 (Ex. 19), 4 (CEx. 7), 6 (CEx. 9), 8 (Ex. 20), and 9 (Ex. 21) should each meet the criteria for a camera lens closely agrees with the experimental data, whereas the RI of CEx. 7 (RI of 1.587) makes it less suitable for a camera lens composition.

Comparison of Birefringence (Retardation) for Different Molding Conditions. Retardation values for Examples 22 and 23, and for a commercial polymer, Comparative Example 11, were determined by preparing molded plaques using different molding conditions to determine the optimum molding conditions for achieving a balance of desirable birefringence and minimal discoloration. Molding conditions used for the polymer compositions evaluated are described in Table 7.

TABLE 7

|  | Setting 1 | Setting 2 | Setting 3 |
|---|---|---|---|
| DOSING | | | |
| Dosing (mm) | 28 | 28 | 28 |
| Screw Speed (% of max. RPM) | 33 | 33 | 33 |
| Back Pressure (bar) | 5 | 5 | 5 |
| Decompression (mm) | — | — | — |
| INJECTION | | | |
| Injection speed (mm/s) | 20 | 64 | 120 |
| Injection pressure (bar) | 160 | 120 | 62 |
| Switch over point (mm) | 7 | 7 | 10 |
| After pressure (bar) | 144 | 46 | 45 |
| After pressure time (s) | 15 | 8 | 3 |
| Cooling time (s) | 15 | 22 | 27 |
| Screw diameter (mm) | — | — | — |
| TEMPERATURE: | | | |
| Hopper (° C.) | 40 | 40 | 40 |
| zone 1 (° C.) | 250 | 290 | 300 |
| zone 2 (° C.) | 260 | 300 | 310 |
| zone 3 (° C.) | 270 | 310 | 320 |
| Nozzle (° C.) | 265 | 305 | 315 |
| Mold (° C.) | 65 | 75 | 100 |

Figure 8:
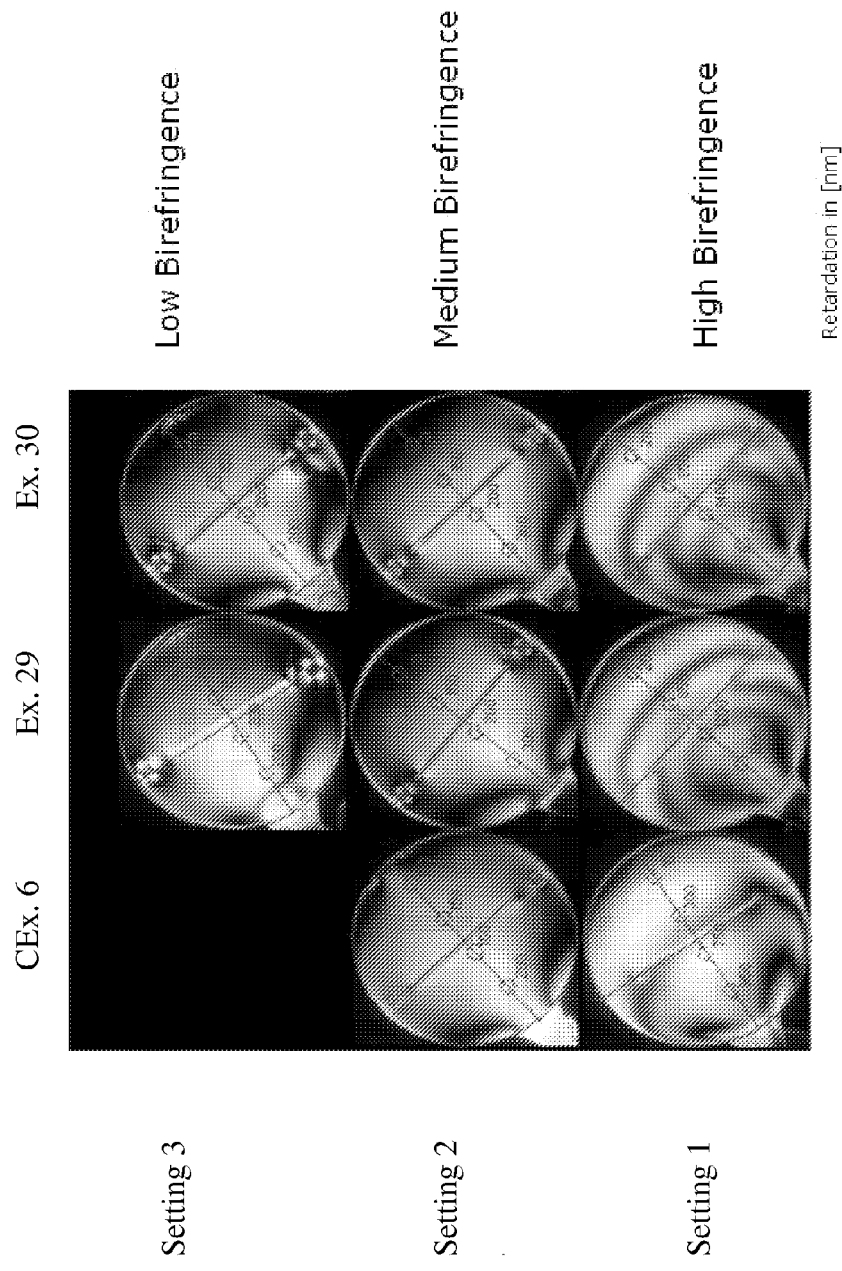
FIG. 8 is a photograph showing the comparative effects of extrusion and molding temperature on different exemplary compositions.

A total of 3 different molding settings, Settings 1, 2, and 3, were used to determine optimum molding conditions for lowest retardation for Example 22 (corresponding to 90:10 mol % BPA/DDDA copolymer) and Example 23 (corresponding to 90:10 mol % DMBPC/DDDA), each prepared by interfacial polymerization as described above for Example 21, and for Comparative Example 11 (ZEONEX® E48R Cyclo-Olefin polymer, available from Zeon Chemicals). Retardation was measured on 1.2 mm thick plaques molded at barrel heating zone temperatures of 300, 310, and 320° C., a nozzle temperature of 315° C., and a mold temperature of 100° C., conditioned at 50% relative humidity for 24 hours, and analyzed using a polarized-light microscope and the Michel-Levy birefringence chart, and reported in units of nanometers (nm) as the average calculated retardation for samples of each polymer molded into a sample lens using the extruding and molding conditions discussed above for Ex. 1. Destructive interference patterns for each molded plaque were measured using this method at a point on the plaque 1.3 cm from the injection point. An example of the destructive interference is shown in FIG. 8, which shows interference color patterns (rainbow-like effect) for each of Exs. 22 and 23, and CEx. 11, obtained at Settings 1, 2, and 3 from the increased birefringence. The retardation values for the examples and comparative examples in FIG. 8 are summarized in Table 8.

TABLE 8

| | Comparative Example 11 | Example 22 | Example 23 |
|---|---|---|---|
| Setting 3 | — | 200 nm | 200 nm |
| Setting 2 | 200 nm | 300 nm | 300 nm |
| Setting 1 | 950 nm | 1800 nm | 2100 nm |

*Retardation (in nm) for 1.2 mm thick plaques, measured 1.3 cm from the point of injection.

Table 8 shows that the polymer composition of Examples 22 and 23 each have a maximum retardation value of 200 nm, measured 1.3 cm from the point of injection for the plaque, at Setting 3 (for which the barrel heating zones 1 to 3 and nozzle temperature are each 10° C. higher, and the mold temperature is 25° C. higher, than for Setting 2). Comparative Example 11 also exhibited a maximum retardation of 200 nm and was comparable to Examples 22 and 23 at the higher barrel, nozzle, and mold temperatures of setting 3. Generally, the best birefringence (i.e., the lowest maximum retardation value) was obtained with the highest molding temperature; however, increased molding temperatures correlate with increased resin discoloration (i.e., decomposition), and it is therefore necessary to optimize for a balance of color of the final article with birefringence.

Figure 9:
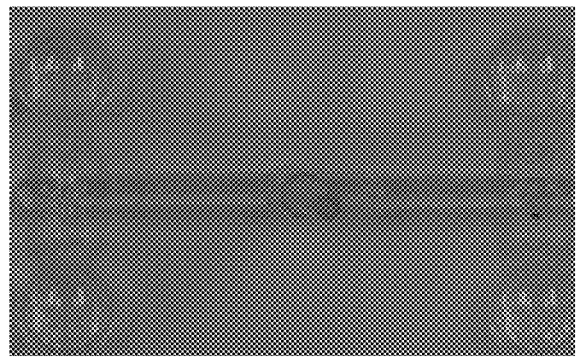
FIG. 9 is a photograph of exemplary lenses for determining birefringence.

FIG. 9 further illustrates the sensitivity of the Examples 22 and 23, and Comparative Example 11 for these different molding conditions and provides an indication of the optimal molding conditions needed to obtain the lowest birefringence. It is seen in the data that birefringence improved with change in settings from 1→2→3(i.e., with increasing temperature of the barrel heating zones 1 to 3, injection nozzles, and mold), as evidenced where the plaques molded at Settings 2 and 3 had the least interference color patterning (where the lowest were for Examples 22 and 23 at Setting 3, and Comparative Example 11 at setting 2) whereas Example 23 at Setting 1 clearly shows the greatest interference color as well as the highest maximum retardation value of 2,100 nm.

Birefringence measurements of molded lenses. Birefringence was measured for lenses molded at different barrel temperatures where temperatures may be varied to obtain the lowest total birefringence without causing a defect in the molded lenses. A Fanuc 50T-molding machine with a diameter of 22 mm at an injection cycle time of 90 second was used to prepare 4 lenses per injection, as shown in FIG. 9. The weight of the 4 lenses plus the runner is 5.1 g, and because the corresponding volume of polymer per injection is so low, and because the cycle time for producing a set of four lenses is high (90 sec), the residence time for the polymer in the barrel is over 25 minutes under temperature, which can cause decomposition and discoloration with increased and prolonged temperature.

Typically, evaluation of the polymer composition is initiated at a barrel temperature of 330° C. and the samples are checked for injection flaws such as splay, discoloration, streaks, and bubbles, where a uniformly shaped lens is required, as seen in FIG. 9. Where such defects are observed, the barrel temperature is reduced in 5° C. increments with molding carried out at each increment until a flawless, uniformly shaped lens is obtained.

Figure 10:
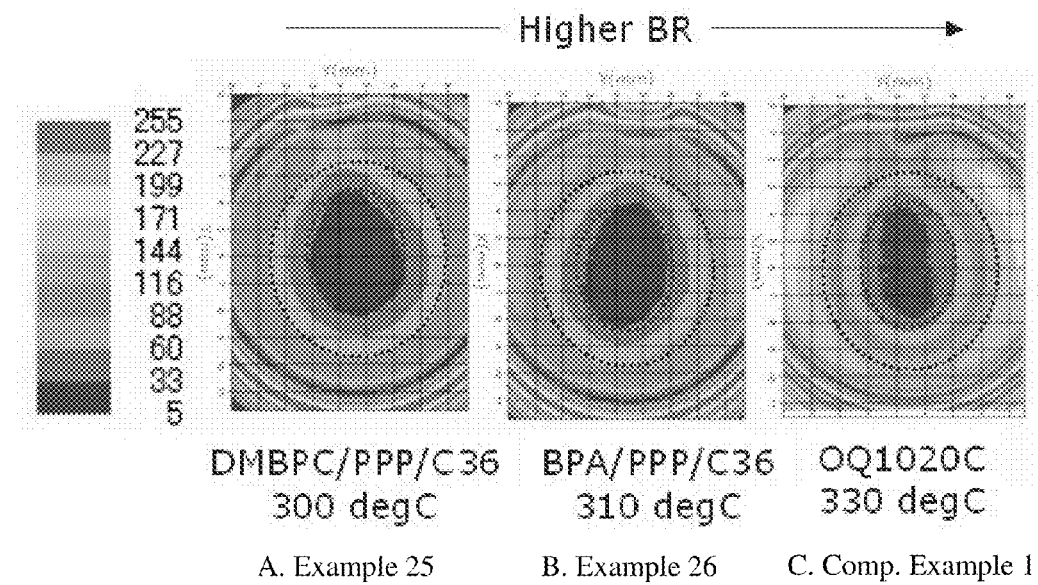
FIG. 10 shows birefringence color contour maps of A. and B. lenses prepared using exemplary poly(aliphatic ester)-polycarbonate compositions, and C. a lens prepared using a polycarbonate.

The total birefringence of the molded lens was measured using the KOBRA-CCD Automatic Birefringence Analyzer, operating at a wavelength of 590 nm as discussed above. FIG. 10 shows representative recordings of a lens based on a DMBPC/PPPBP/$C_{36}$ diacid terpolymer (Example 25 from Table 6), BPA/PPPBP/$C_{36}$ diacid terpolymer (Example 21 from Table 6), and standard optical quality polycarbonate (OQ-PC; corresponding to the composition of Comparative Example 1). The different colors are a measure for the retardation. As seen in FIG. 10, each of Examples 24 and 25 shows lower maximum total birefringence for the molded lens (i.e., a retardation of less than 88 nm) for the effective area of each lens, though the effective area of the DMBPC-containing lens is slightly greater (x-y coordinates for the example) than for the BPA-containing lens. Based on these data, the material of Example 20, when molded at a barrel temperature of 300° C., exhibited the lowest overall birefringence as a function of effective lens area.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. For example, ranges of "less than or equal to about 25 wt %, or, more specifically, about 5 wt % to about 20 wt %," are inclusive of the endpoints and all intermediate values of the ranges of "about 5 wt % to about 25 wt %," etc.). The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

As used herein, the term "hydrocarbyl" refers broadly to a substituent comprising carbon and hydrogen, optional with at least one heteroatoms, for example, oxygen, nitrogen, halogen, or sulfur; "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or polycyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Various types of optical grade articles can contain one or more constituents that contain the polymers of the present disclosure.

In one embodiment, the optical grade article is a camera lens, goggle lens, light guide, an imaging medium, or transparent bezel.

One of ordinary skill in the art could manufacture an article of manufacture that encompasses an optical grade article, e.g. camera-manufacturing techniques are well understood in the art.

In one embodiment, the article of manufacture can be an imaging apparatus comprising a light-proof housing, wherein the housing contains a shutter, a shutter control vehicle, an imaging substrate, and a light transmission medium containing an optical grade article comprising a thermoplastic composition comprising a poly(aliphatic ester)-polycarbonate copolymer comprising the following monomeric units: 10 to 25 wt % of a soft block ester unit derived from a $C_{20-44}$ aliphatic dicarboxylic acid or derivative thereof, 34 to 77 wt % of a carbonate unit derived from 2-hydrocarbyl-3,3-bis(4-hydroxyaryl)phthalimidine, 0 to 76 wt % of a carbonate unit derived from a dihydroxyaromatic compound excluding 2-hydrocarbyl-3,3-bis(4-hydroxyaryl)phthalimidine, and wherein the sum of the weight percentages of soft block ester units, 2-hydrocarbyl-3,3-bis(4-hydroxyaryl)phthalimidine units, and dihydroxyaromatic compound units is 100 weight percent of the monomeric units of the poly(aliphatic ester)-polycarbonate, and wherein the refractive index of the thermoplastic composition is greater than or equal to 1.590, and the glass transition temperature of the copolymer is from 120 to 155° C.

In another embodiment, the article of manufacture can be an imaging apparatus comprising a light-proof housing, wherein the housing contains a shutter, a shutter control vehicle, an imaging substrate, and a light transmission medium containing composition comprising: a) a poly(aliphatic ester)-polycarbonate copolymer comprising the following monomeric units: 10 to 25 wt % of soft block ester units of the formula (9e):

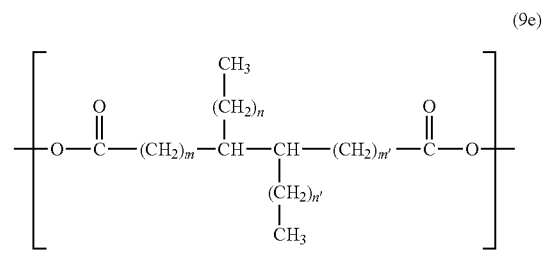

wherein m and m' are independently 0 to 38, n and n' are independently 0 to 38, and the sum m+m'+n+n' is an integer from 14 to 38; 34 to 77 wt % of a carbonate unit derived from 2-hydrocarbyl-3,3-bis(4-hydroxyaryl)phthalimidine, and 0 to 76 wt % of a carbonate unit derived from a dihydroxyaromatic compound not identical to the 2-hydrocarbyl-3,3-bis(4-hydroxyaryl)phthalimidine, wherein the sum of the weight percentages of soft block ester units, 2-hydrocarbyl-3,3-bis(4-hydroxyaryl)phthalimidine units, and dihydroxyaromatic compound units is 100 weight percent of the monomeric units of the poly(aliphatic ester)-polycarbonate, and b) a BPA polycarbonate, wherein an article molded from the thermoplastic composition and having a thickness of 3.2 mm has a haze of less than or equal to 1.0 percent, when measured according to ASTM D1003-00, wherein the refractive index of the thermoplastic composition is greater than or equal to 1.590, and wherein the camera lens has an effective lens area of 0.5 mm$^2$ to 100 mm$^2$ and is molded from the thermoplastic composition at a barrel temperature of 300° C., and measured for birefringence by the parallel Nicols method at a wavelength of 590 nm, has a birefringence of less than or equal to 90 nanometers.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

As used herein, "comprising" is inclusive of "consisting essentially of" and "consisting of". In a further embodiment, the invention encompasses combinations and subcombinations of dependent claims into an independent claim. For example, if two dependent claims depend upon an independent claim, the subject matter of both dependent claims can be combined into an independent claim.

In yet another embodiment, a disclosed range, for example wt %, temperature, molecular weight, and/or carbon content, includes any intermediate values within the range, and/or as including any sub-ranges within the disclosed range.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

We claim:

1. An optical grade article comprising a thermoplastic composition comprising a poly(aliphatic ester)-polycarbonate copolymer comprising the following monomeric units:
   10 to 25 wt % of a soft block ester unit derived from a $C_{20-44}$ aliphatic dicarboxylic acid or derivative thereof,
   34 to 77 wt % of a carbonate unit derived from 2-hydrocarbyl-3,3-bis(4-hydroxyaryl)phthalimidine,
   0 to 76 wt % of a carbonate unit derived from a dihydroxyaromatic compound excluding 2-hydrocarbyl-3,3-bis(4-hydroxyaryl)phthalimidine, and wherein the sum of the weight percentages of soft block ester units, 2-hydrocarbyl-3,3-bis(4-hydroxyaryl)phthalimidine units, and dihydroxyaromatic compound units is 100 weight percent of the monomeric units of the poly(aliphatic ester)-polycarbonate, and
   wherein the refractive index of the thermoplastic composition is greater than or equal to 1.590, and the glass transition temperature of the copolymer is from 120 to 155° C.

2. The optical grade article of claim 1, comprising the following monomeric units:
   10 to 25 wt % of the soft block ester unit, and
   34 to 75 wt % of the carbonate unit derived from 2-hydrocarbyl-3,3-bis(4-hydroxyaryl)phthalimidine, and
   0 to 58 wt % of the carbonate unit derived from a dihydroxyaromatic compound excluding 2-hydrocarbyl-3,3-bis(4-hydroxyaryl)phthalimidine,
   wherein the sum of the weight percentages of soft block ester units, 2-hydrocarbyl-3,3-bis(4-hydroxyaryl)phthalimidine units, and dihydroxyaromatic compound units is 100 weight percent of the monomeric units of the poly(aliphatic ester)-polycarbonate.

3. The optical grade article of claim 1, the poly(aliphatic ester)-polycarbonate comprising the following monomeric units:
   11 to 21 wt % of the soft block ester unit,
   34 to 53 wt % of the carbonate unit derived from 2-hydrocarbyl-3,3-bis(4-hydroxyaryl)phthalimidine, and
   33 to 58 wt % of the carbonate unit derived from a dihydroxyaromatic compound excluding 2-hydrocarbyl-3,3-bis(4-hydroxyaryl)phthalimidine,
   wherein the sum of the weight percentages of soft block ester units, 2-hydrocarbyl-3,3-bis(4-hydroxyaryl)phthalimidine units, and dihydroxyaromatic compound units is 100 weight percent of the monomeric units of the poly(aliphatic ester)-polycarbonate.

4. The optical grade article of claim 1, wherein the poly(aliphatic ester)-polycarbonate copolymer has a weight average molecular weight of 10,000 to 25,000 g/mol, when measured by gel permeation chromatography using a crosslinked styrene-divinylbenzene column calibrated to polycarbonate standards.

5. The optical grade article of claim 1, wherein the thermoplastic composition has a melt volume rate of 13 to 25 cc/10 min at 250° C. and under a load of 1.2 kg and a dwell time of 4 minutes, according to ISO 1133.

6. The optical grade article of claim 1, wherein the soft block ester units are derived from a branched aliphatic dicarboxylic acid of formula (9f):

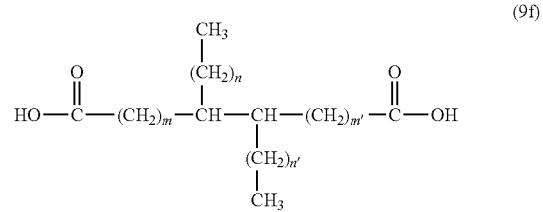

wherein m and m' are independently 0 to 38, n and n' are independently 0 to 38, and the sum m+m'+n+n' is an integer from 14 to 38.

7. The optical grade article of claim 1, wherein the $C_{20-44}$ aliphatic dicarboxylic acid comprises $C_{36}$ aliphatic dicarboxylic acid, $C_{44}$ aliphatic dicarboxylic acid, or a combination comprising at least one of the foregoing.

8. The optical grade article of claim 1, wherein the 2-hydrocarbyl-3,3-bis(4-hydroxyaryl)phthalimidine has the formula (8):

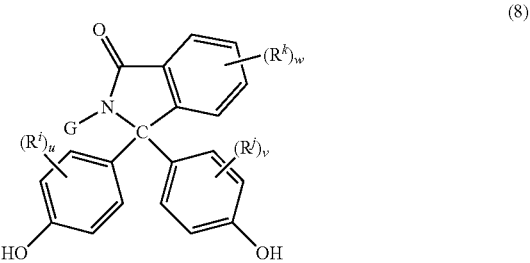

wherein $R^i$, $R^j$, and $R^k$ are independently $C_{1-12}$ hydrocarbyl, G is a $C_{1-12}$ alkyl or $C_{6-18}$ aromatic group, and u, v, and w are each independently an integer from 0 to 4.

9. The optical grade article of claim 8, wherein the 2-hydrocarbyl-3,3-bis(4-hydroxyaryl)phthalimidine is 2-phenyl-3,3-bis(4-hydroxyphenyl)phthalimidine, having the formula (8a):

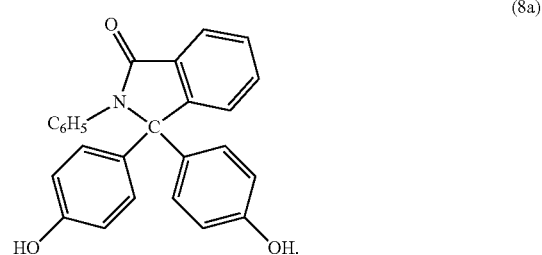

10. The optical grade article of claim 1, wherein the dihydroxyaromatic compound comprises bisphenol A, bis(3-methyl-4-hydroxyphenyl)cyclohexane, or a combination comprising at least one of the foregoing.

11. The optical grade article of claim 1, wherein the thermoplastic composition when molded into an article having a thickness of 3.2 mm, has a haze of less than or equal to 1.0 percent, when measured according to ASTM D1003-00.

12. The optical grade article of claim 1, wherein the thermoplastic composition when molded into an article having a thickness of 3.2 mm, has a transmittance of greater than or equal to 85 percent, when measured according to ASTM D1003-00.

13. The optical grade article of claim 1, wherein the thermoplastic composition, when molded into an article having a thickness of 3.2 mm, has a yellowness index (YI) of less than 4, when measured according to ASTM D1925-70.

14. The optical grade article of claim 1, wherein the birefringence of a plaque having a thickness of 1.2 mm and molded from the thermoplastic composition at a barrel temperature of 300° C. and a mold temperature of 100° C. has a comparative average birefringence measured by polarized light microscope using the Michel-Levy birefringence scale of less than or equal to 300 nanometers.

15. The optical grade article of claim 1, wherein the intrinsic birefringence of a film of the poly(aliphatic ester)-polycarbonate, having a thickness of 250 to 500 nm, and rubbed the point of saturation, is less than or equal to 0.015.

16. The optical grade article of claim 1, wherein the thermoplastic composition further comprises a polycarbonate.

17. The optical grade article of claim 16, wherein the thermoplastic composition comprises 50 to 99 wt % poly(aliphatic ester)-polycarbonate, and 1 to 50 wt % polycarbonate, based on the total weight of poly(aliphatic ester)-polycarbonate and any added polycarbonate.

18. The optical grade article of claim 1, wherein the optical grade article is a camera lens, goggle lens, light guide, an imaging medium, or transparent bezel.

19. An optical grade article comprising a thermoplastic composition comprising a poly(aliphatic ester)-polycarbonate copolymer comprising:
   10 to 21 wt % of soft block ester units derived from an alpha, omega $C_{20-44}$ aliphatic dicarboxylic acid or derivative thereof,
   34 to 53 wt % of a carbonate unit derived from 2-hydrocarbyl-3,3-bis(4-hydroxyaryl)phthalimidine,
   34 to 58 wt % of a carbonate unit derived from a dihydroxyaromatic compound not identical to the 2-hydrocarbyl-3,3-bis(4-hydroxyaryl)phthalimidine,
   wherein the sum of the weight percentages of the soft block ester units, 2-hydrocarbyl-3,3-bis(4-hydroxyaryl)phthalimidine units, and dihydroxyaromatic compound units is 100 weight percent of the monomeric units of the poly(aliphatic ester)-polycarbonate,
   wherein the thermoplastic composition when molded into an article having a thickness of 3.2 mm, has a haze of less than or equal to 1.0 percent, when measured according to ASTM D1003-00,
   wherein the refractive index of the thermoplastic composition at a mold temperature of 100° C. is greater than 1.590, and the glass transition temperature of the poly(aliphatic ester)-polycarbonate is from 135 to 140° C.

20. A camera lens comprising a thermoplastic composition comprising:
   a) a poly(aliphatic ester)-polycarbonate copolymer comprising the following monomeric units:
   10 to 25 wt % of soft block ester units of the formula (9e):

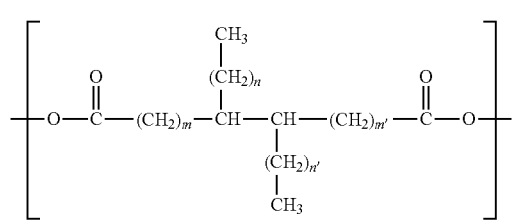

(9e)

wherein m and m' are independently 0 to 38, n and n' are independently 0 to 38, and the sum m+m'+n+n' is an integer from 14 to 38;
   34 to 77 wt % of a carbonate unit derived from 2-hydrocarbyl-3,3-bis(4-hydroxyaryl)phthalimidine, and
   0 to 76 wt % of a carbonate unit derived from a dihydroxyaromatic compound not identical to the 2-hydrocarbyl-3,3-bis(4-hydroxyaryl)phthalimidine,
   wherein the sum of the weight percentages of soft block ester units, 2-hydrocarbyl-3,3-bis(4-hydroxyaryl)phthalimidine units, and dihydroxyaromatic compound units is 100 weight percent of the monomeric units of the poly(aliphatic ester)-polycarbonate, and
   b) optionally, a polycarbonate,
   wherein an article molded from the thermoplastic composition and having a thickness of 3.2 mm has a haze of less than or equal to 1.0 percent, when measured according to ASTM D1003-00,
   wherein the refractive index of the thermoplastic composition is greater than or equal to 1.590, and wherein the camera lens having an effective lens area of 0.5 mm² to 100 mm² and molded from the thermoplastic composition at a barrel temperature of 300° C., and measured for birefringence by the parallel Nicols method at a wavelength of 590 nm, has a birefringence of less than or equal to 90 nanometers.

21. The camera lens of claim 20, having an effective lens area of 0.5 to 10 mm².

22. The camera lens of claim 20, wherein the camera lens thickness is from 0.25 to 2.5 mm.

23. An imaging apparatus comprising a light proof housing, wherein said housing contains a light transmission medium containing an optical grade article of claim 1, a shutter, a shutter control vehicle, and an imaging substrate.

24. A camera lens comprising a thermoplastic composition comprising:
   a) a poly(aliphatic ester)-polycarbonate copolymer comprising the following monomeric units:
   10 to 25 wt % of soft block ester units of the formula (9e):

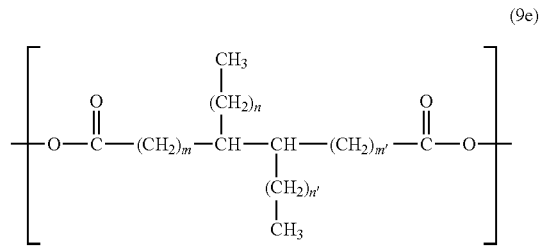

(9e)

wherein m and m' are independently 0 to 38, n and n' are independently 0 to 38, and the sum m+m'+n+n' is an integer from 14 to 38;
   34 to 77 wt % of a carbonate unit derived from 2-hydrocarbyl-3,3-bis(4-hydroxyaryl)phthalimidine, and
   0 to 76 wt % of a carbonate unit derived from a dihydroxyaromatic compound not identical to the 2-hydrocarbyl-3,3-bis(4-hydroxyaryl)phthalimidine,
   wherein the sum of the weight percentages of soft block ester units, 2-hydrocarbyl-3,3-bis(4-hydroxyaryl)phthalimidine units, and dihydroxyaromatic compound units is 100 weight percent of the monomeric units of the poly(aliphatic ester)-polycarbonate, and b) a BPA polycarbonate wherein an article molded from the thermoplastic composition and having a thickness of 3.2 mm has a haze of less than or equal to 1.0 percent, when measured according to ASTM D1003-00, wherein the refractive index of the thermoplastic composition is greater than or equal to 1.590, and wherein the camera lens having an effective lens area of 0.5 mm$^2$ to 100 mm$^2$ and molded from the thermoplastic composition at a barrel temperature of 300° C., and measured for birefringence by the parallel Nicols method at a wavelength of 590 nm, has a birefringence of less than or equal to 90 nanometers.

* * * * *